United States Patent
Hubbs

(10) Patent No.: US 12,367,746 B2
(45) Date of Patent: Jul. 22, 2025

(54) MULTIFACETED SECURITY SYSTEM

(71) Applicant: Melody Rae Hubbs, Richmond, KY (US)

(72) Inventor: Melody Rae Hubbs, Richmond, KY (US)

(*) Notice: Subject to any disclaimer, the term of this patent is extended or adjusted under 35 U.S.C. 154(b) by 22 days.

(21) Appl. No.: 18/464,647

(22) Filed: Sep. 11, 2023

(65) Prior Publication Data
US 2024/0112555 A1 Apr. 4, 2024

Related U.S. Application Data

(60) Provisional application No. 63/368,200, filed on Jul. 12, 2022.

(51) Int. Cl.
| | | |
|---|---|---|
| *H04N 7/18* | (2006.01) | |
| *G06K 7/10* | (2006.01) | |
| *G06V 20/52* | (2022.01) | |
| *G08B 13/196* | (2006.01) | |

(52) U.S. Cl.
CPC ....... *G08B 13/196* (2013.01); *G06K 7/10366* (2013.01); *G06V 20/52* (2022.01); *H04N 7/181* (2013.01)

(58) Field of Classification Search
USPC ......................................................... 348/143
See application file for complete search history.

(56) References Cited

U.S. PATENT DOCUMENTS

| | | |
|---|---|---|
| 7,019,639 B2 | 3/2006 | Stilp |
| 7,081,815 B2 | 7/2006 | Runyon et al. |
| 7,411,497 B2 | 8/2008 | Kates |
| 7,728,725 B2 | 6/2010 | Cecil |
| 8,334,775 B2 | 12/2012 | Tapp et al. |
| 8,362,945 B2 | 1/2013 | Nguyen et al. |
| 8,373,542 B2 | 2/2013 | Lee |
| 8,456,305 B2 | 6/2013 | Gates |
| 9,805,582 B2 * | 10/2017 | Jedwab ............ G08B 13/19654 |
| 9,881,216 B2 | 1/2018 | Buehler |
| 10,496,859 B2 | 12/2019 | Sawyer |
| 2007/0252001 A1 | 11/2007 | Kail et al. |
| 2008/0084317 A1 | 4/2008 | Gakhar et al. |
| 2010/0149335 A1 * | 6/2010 | Miller, II ............ G08B 13/1961 348/148 |

(Continued)

OTHER PUBLICATIONS

Solutions the one platform. CloudMedx. (Jun. 27, 2023). https://cloudmedxhealth.com/product-solutions/one-platform/.

*Primary Examiner* — Nigar Chowdhury
(74) *Attorney, Agent, or Firm* — Dunlap Bennett & Ludwig, PLLC

(57) ABSTRACT

The present disclosure discloses a surveillance system. The system includes a plurality of detection units configured to monitor activity in a facility. The system further includes a transceiver configured to receive information associated with the facility, and a processor communicatively coupled to the plurality of detection units and the transceiver unit. The processor may be configured to obtain inputs from the plurality of detection units and information from the transceiver. The processor may be further configured to determine a malicious/suspicious activity based on the inputs and the information, and generate security alert responsive to determination of the activity. The system can employ AI technology to make decisions as to the type of threat present.

11 Claims, 40 Drawing Sheets

(56) References Cited

U.S. PATENT DOCUMENTS

| | | |
|---|---|---|
| 2015/0116111 A1 | 4/2015 | Foster |
| 2018/0307903 A1* | 10/2018 | Siminoff ............... G06V 10/255 |
| 2019/0287325 A1 | 9/2019 | Paolo |
| 2019/0295207 A1 | 9/2019 | Day et al. |
| 2019/0354773 A1* | 11/2019 | Leizerovich ......... G08B 25/016 |
| 2019/0354774 A1* | 11/2019 | Leizerovich ........... G06V 20/62 |
| 2019/0354776 A1* | 11/2019 | Ribeiro ............ G08B 13/19695 |
| 2020/0294377 A1 | 9/2020 | White |
| 2022/0108578 A1* | 4/2022 | Yakota ................ G07C 9/00896 |
| 2023/0274551 A1* | 8/2023 | Julien .............. G08B 13/19647 |
| | | 348/143 |

* cited by examiner

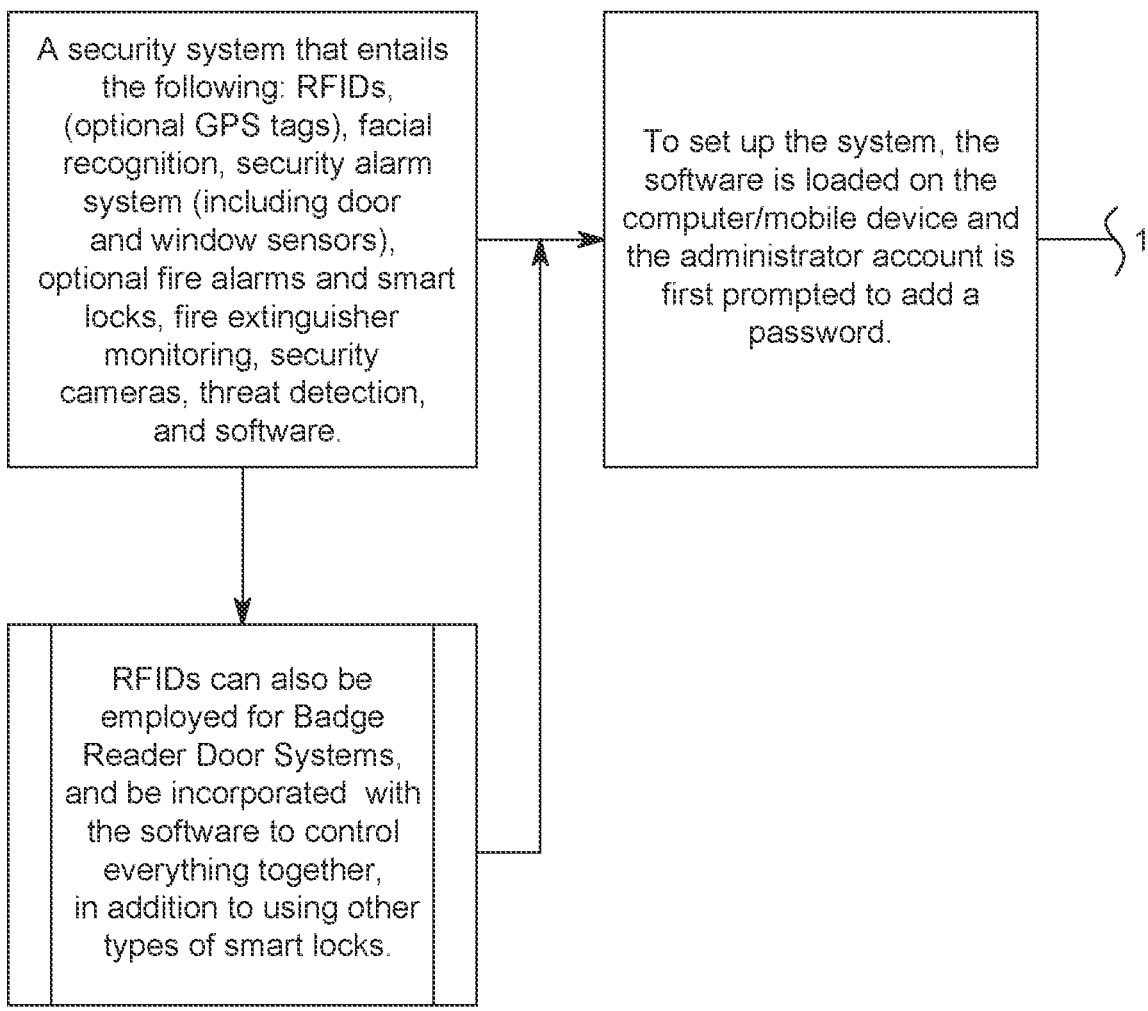
FIG. 1.1

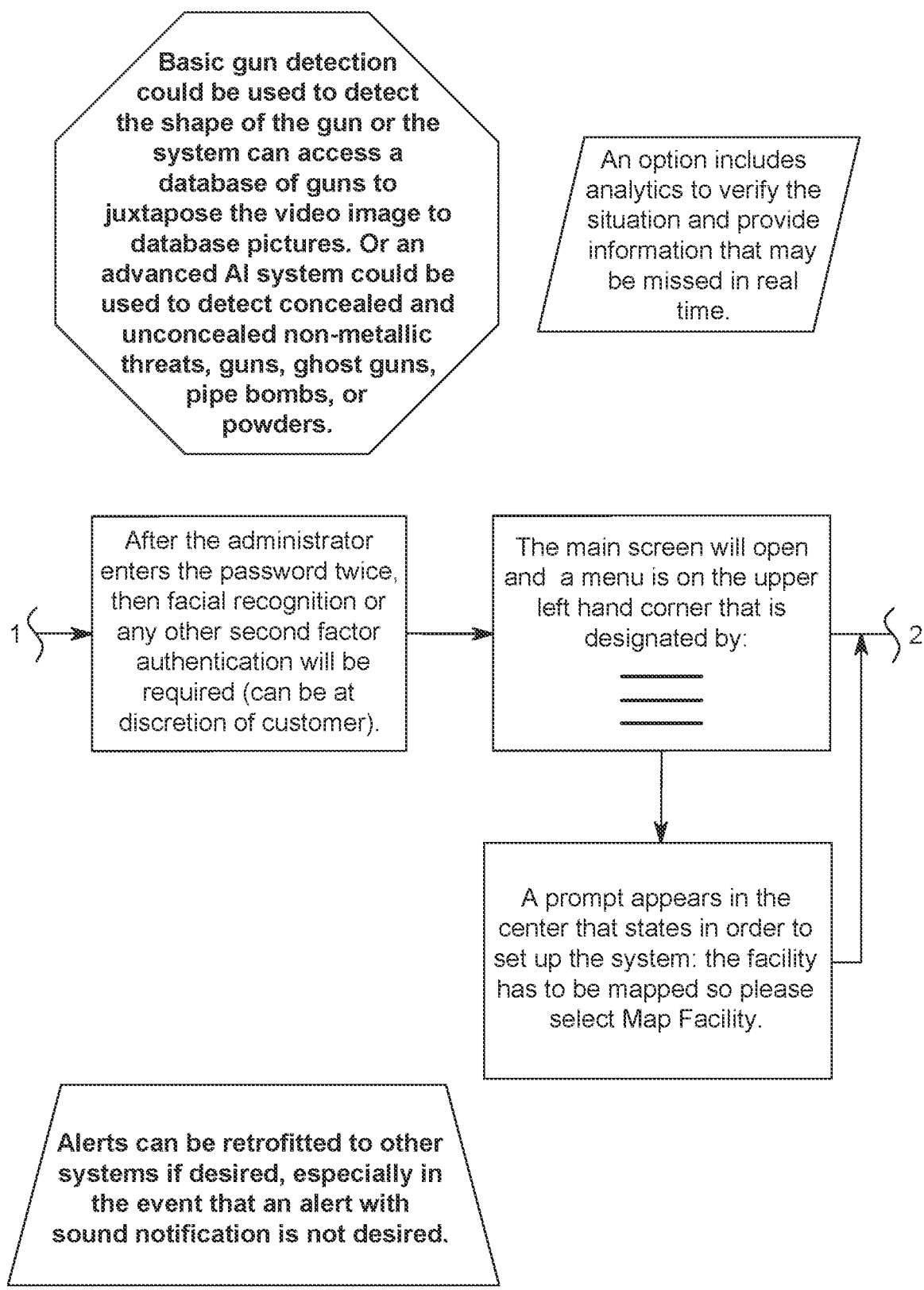
FIG. 1.2

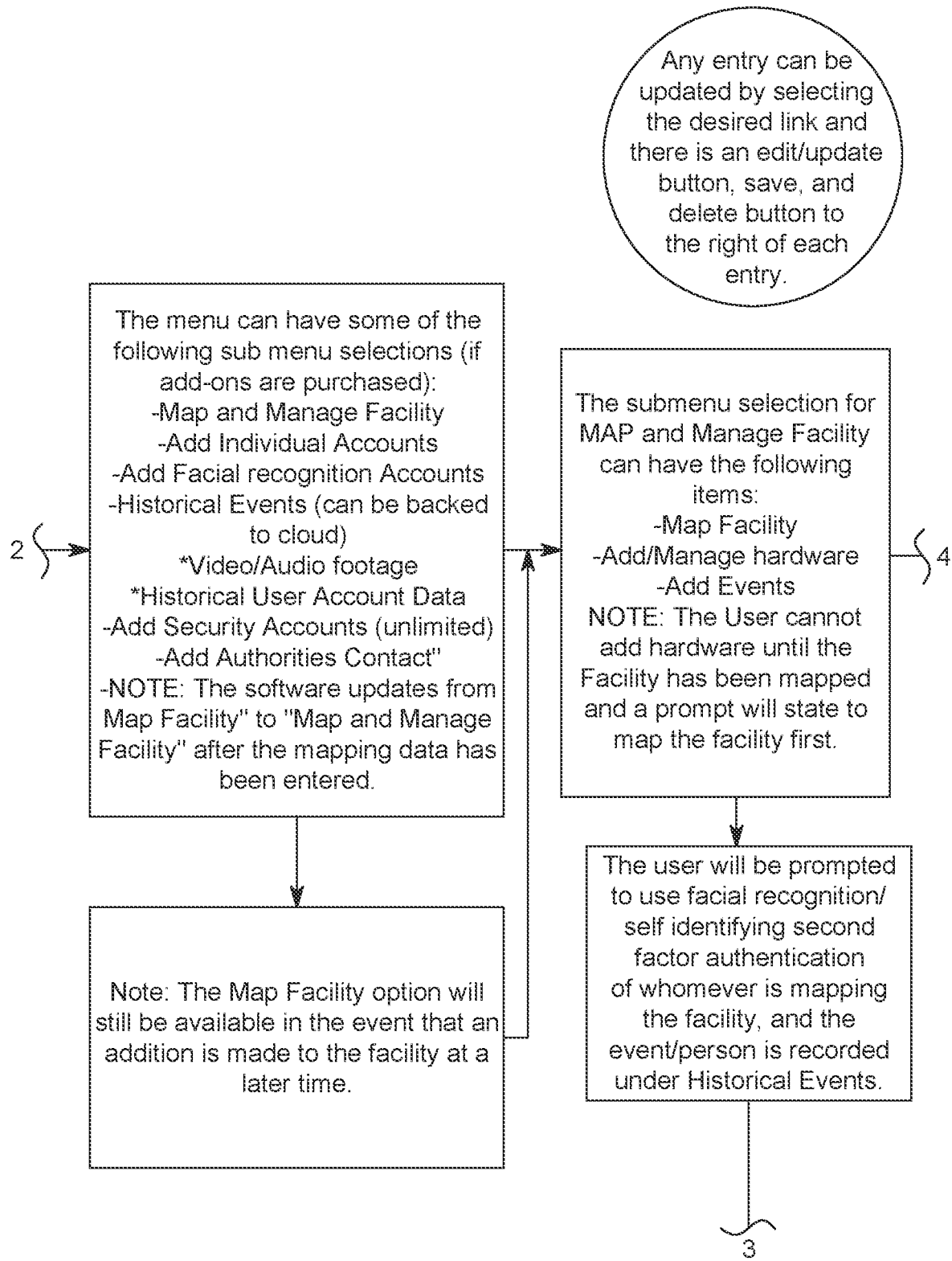
FIG. 1.3

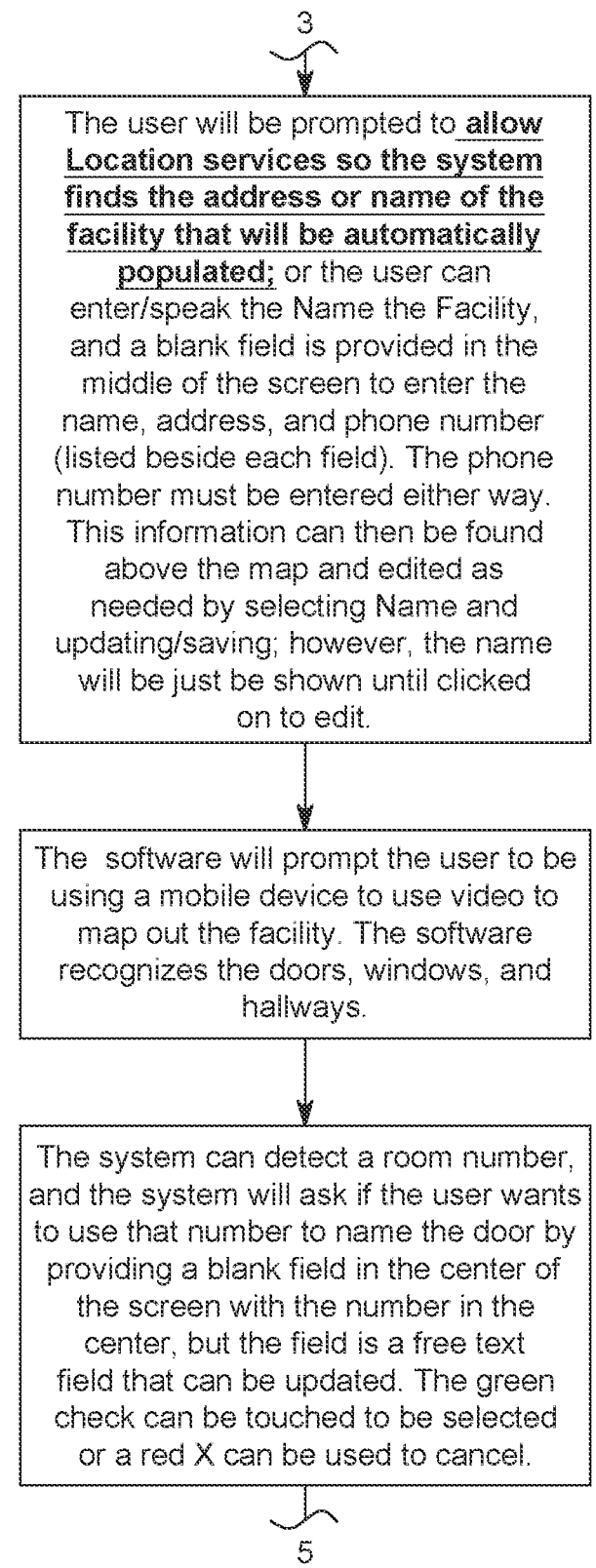
FIG. 1.4

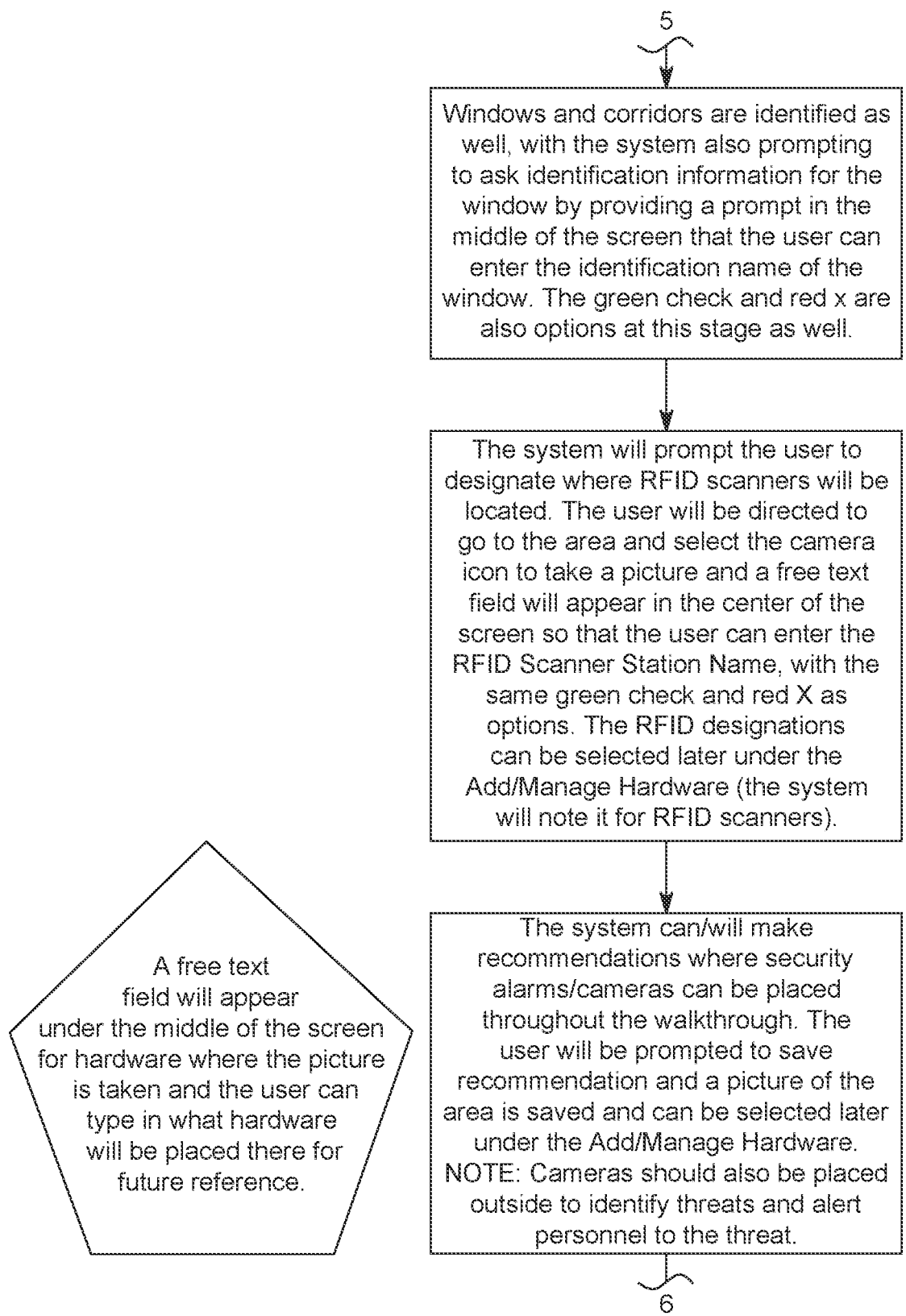
FIG. 1.5

6

```
The system will/can make
recommendations where facial
recognition scanners can be placed
throughout the walkthrough. The
user will be prompted to save
recommendation and a picture of the
area is saved and then can be
selected later under the Add/Manage
Hardware to continue to add more
Facial Recognition scanners.
```

```
The system can/will make
recommendations where fire alarms
can be placed throughout the
walkthrough if it is purchased as an
add-on. The user will be prompted to
save recommendation and a picture of
the area is saved and can be selected
later under the Add/Manage Hardware
submenu to continue to add Fire
Alarms. An upgrade can be purchased
at anytime to allow the system to
manage fire alarms.
```

```
The system will make recommendations
where smart locks can be placed
throughout the walkthrough if it is
purchased as an add-on. The user will
be prompted to save recommendation
and a picture of the area is saved
and can be selected later under the
Add/Manage Hardware submenu to
continue to add smart locks. An upgrade
can be purchased at anytime to allow
the system to manage smart locks.
```

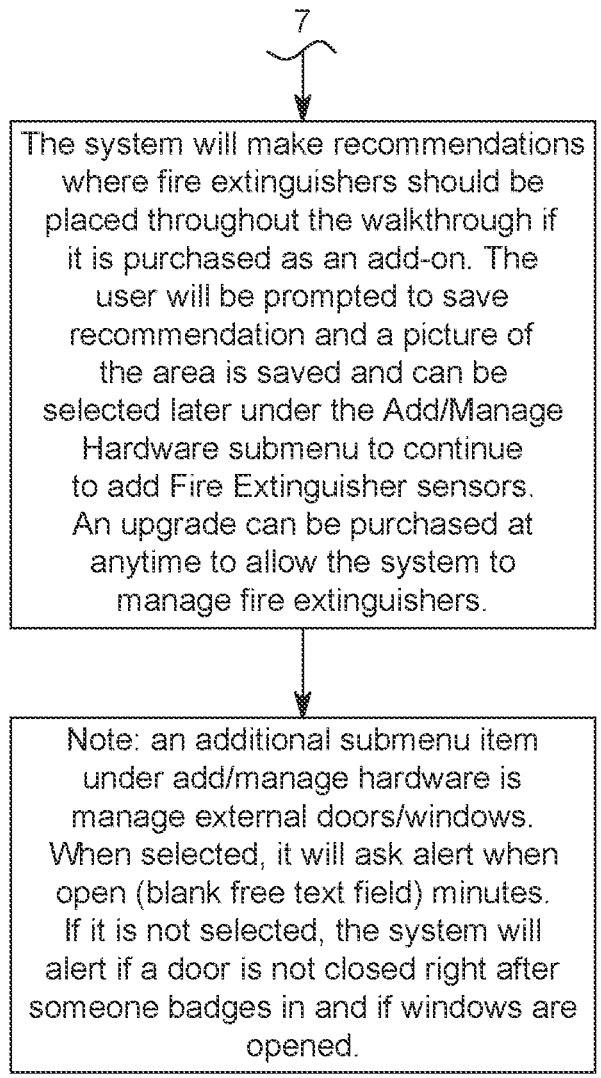
FIG. 1.7

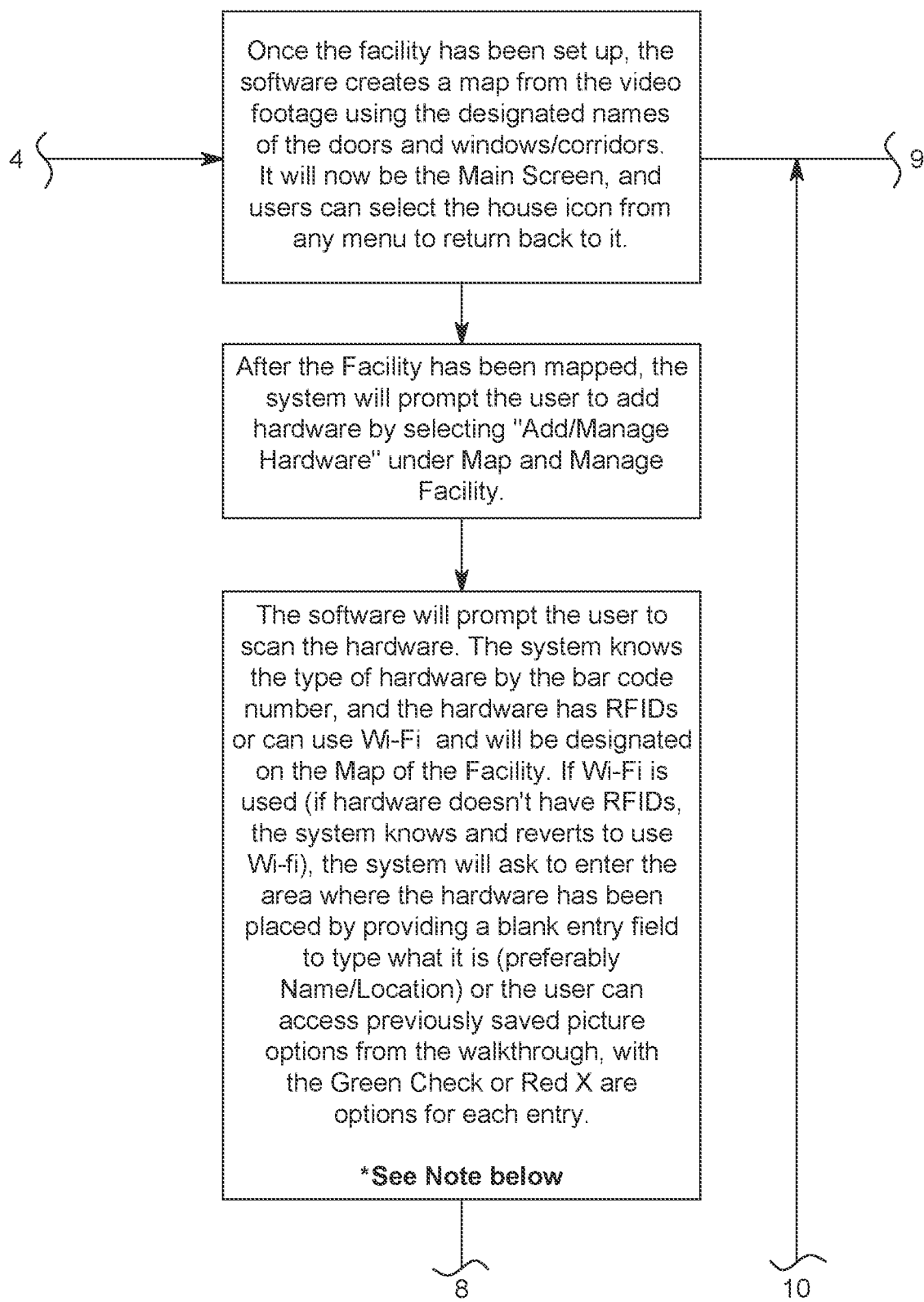
FIG. 1.8

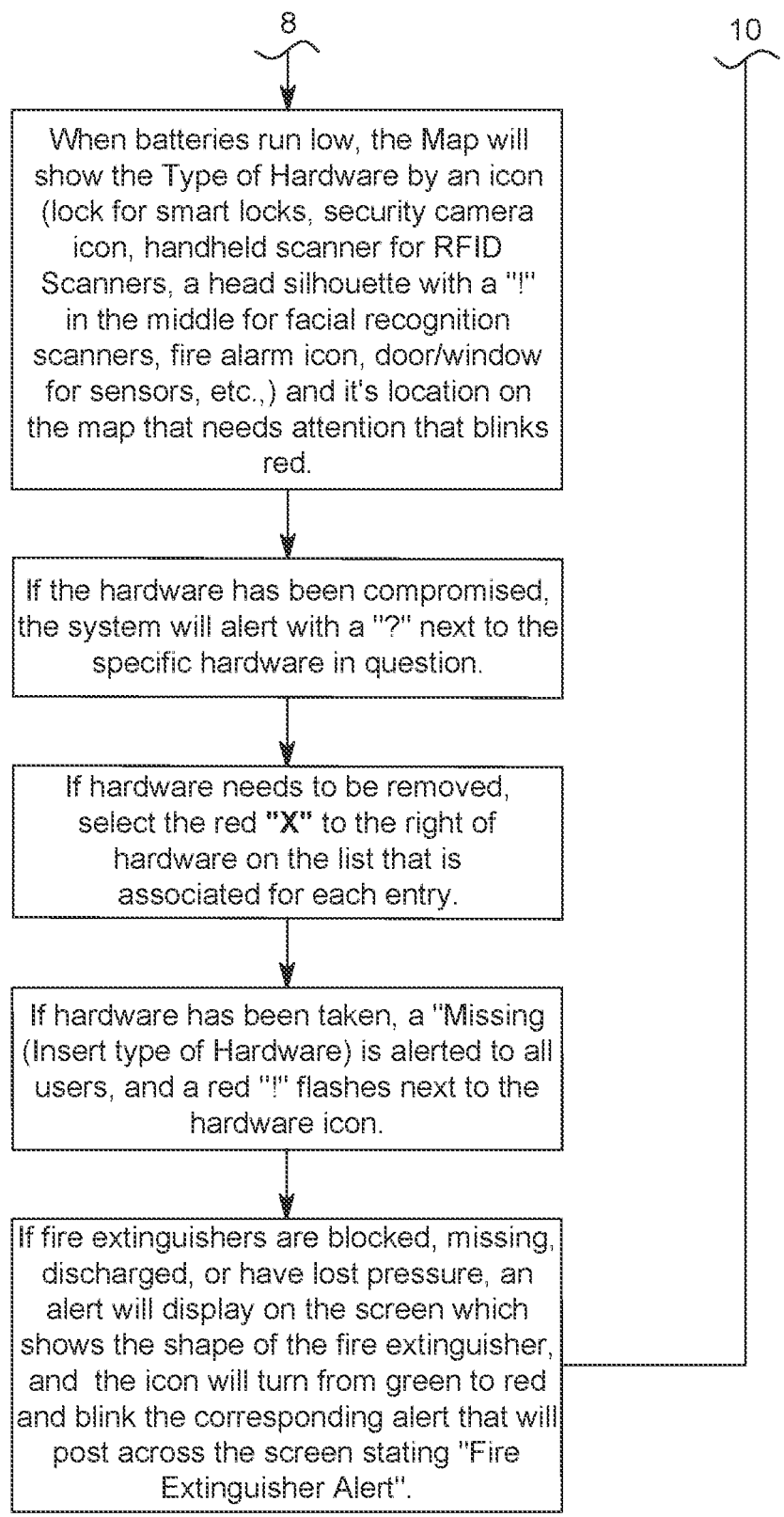
FIG. 1.9

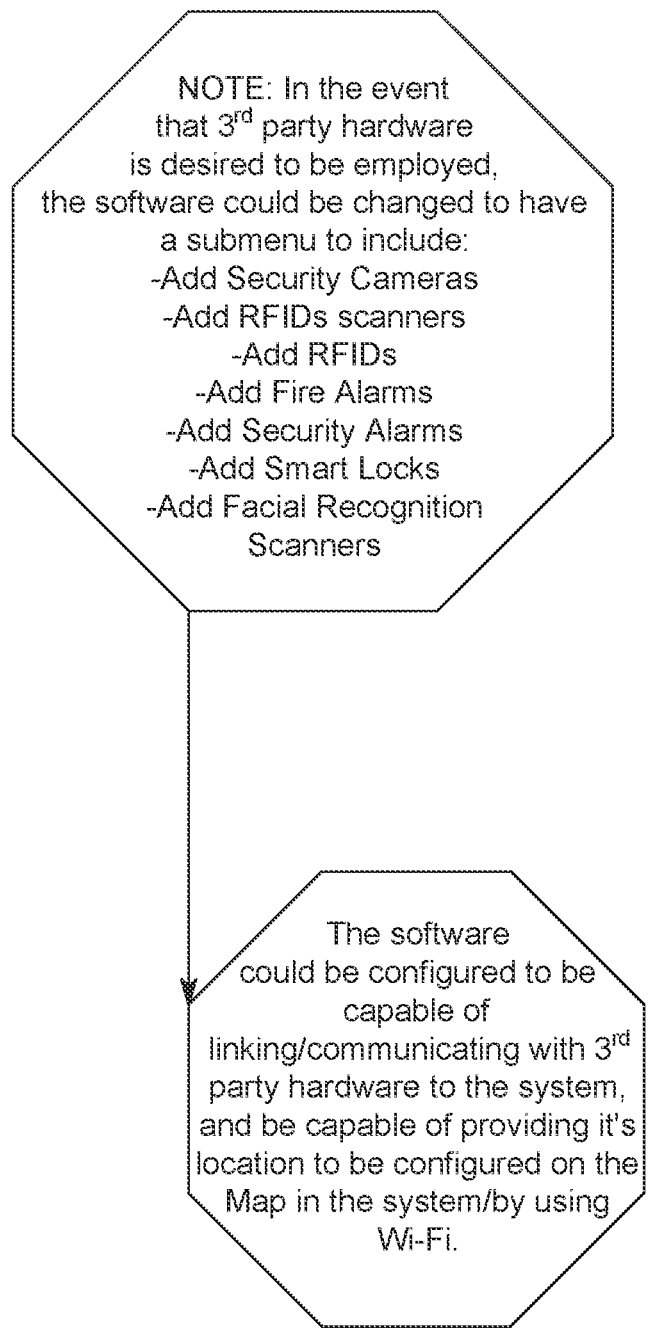
FIG. 1.10

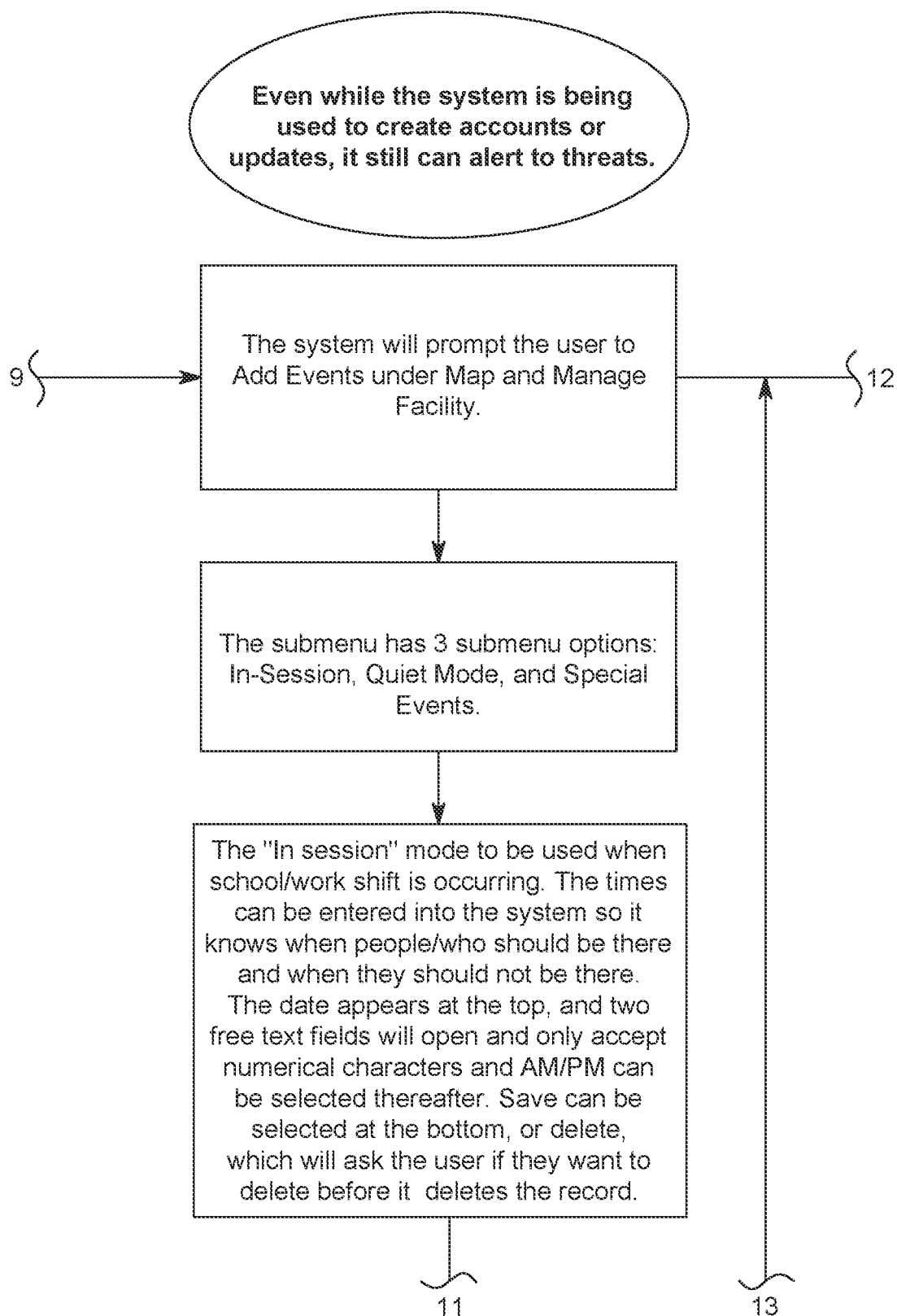
FIG. 1.11

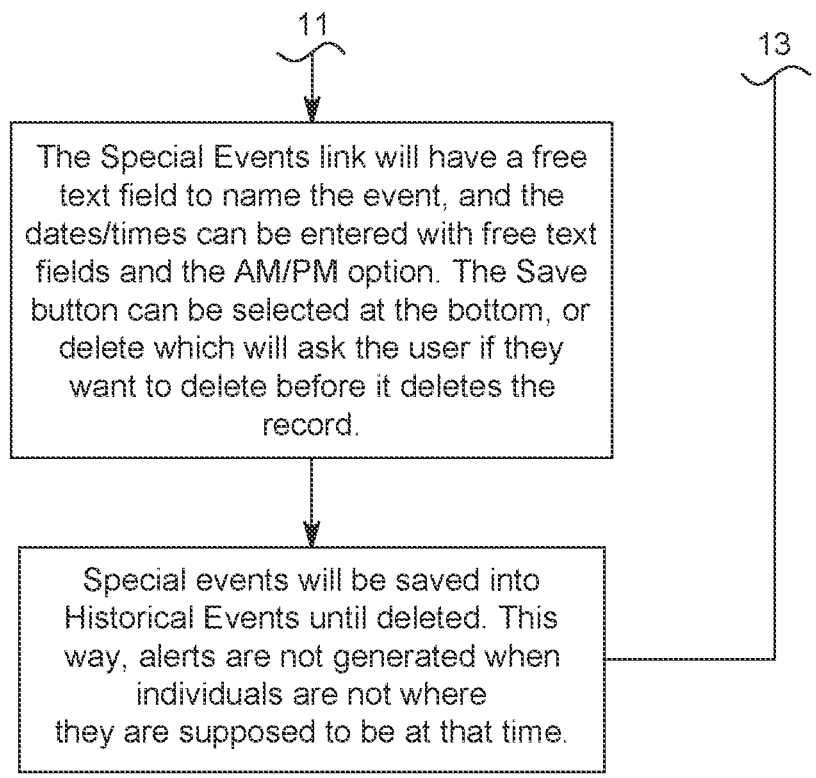
FIG. 1.12

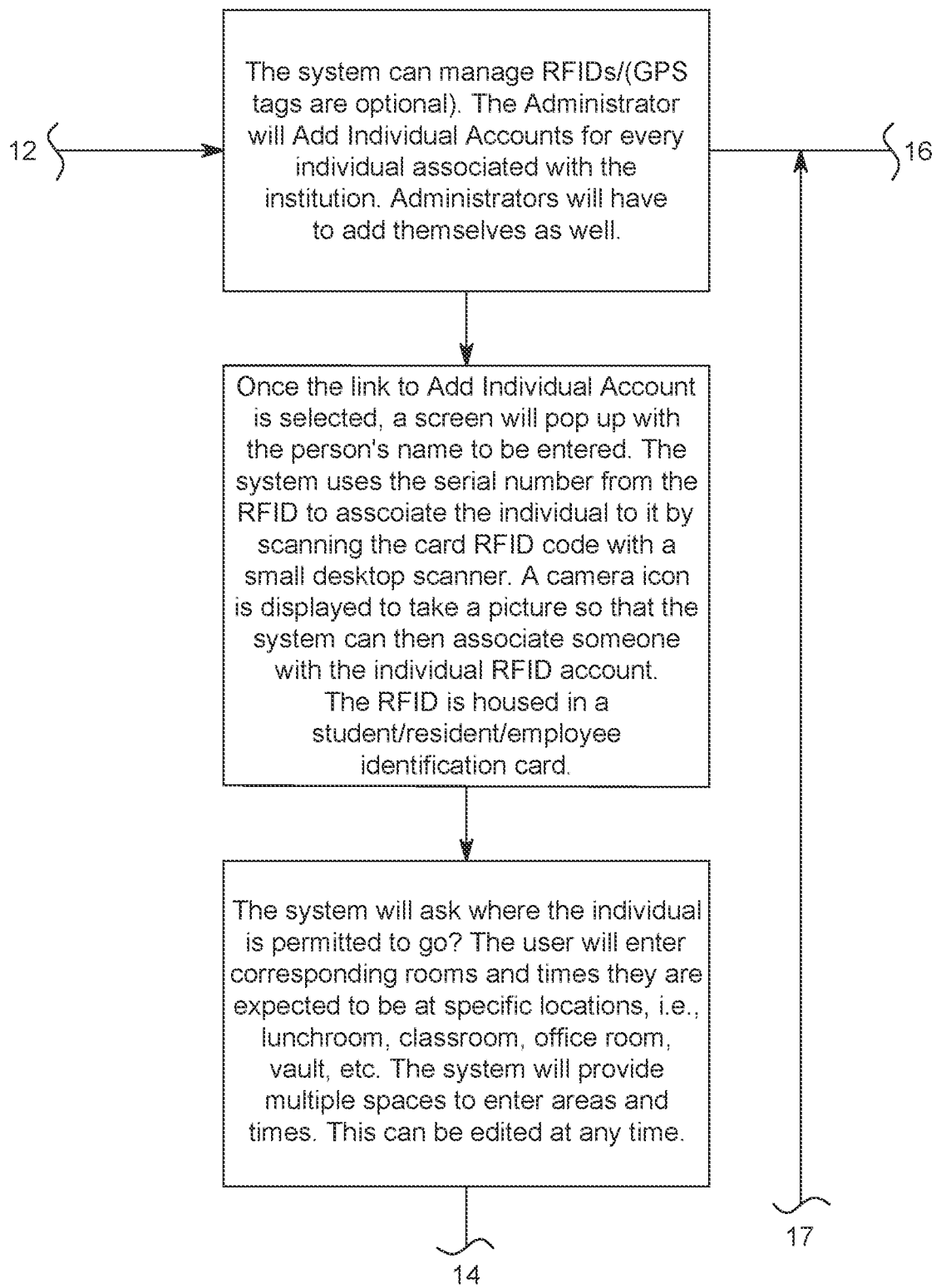
FIG. 1.13

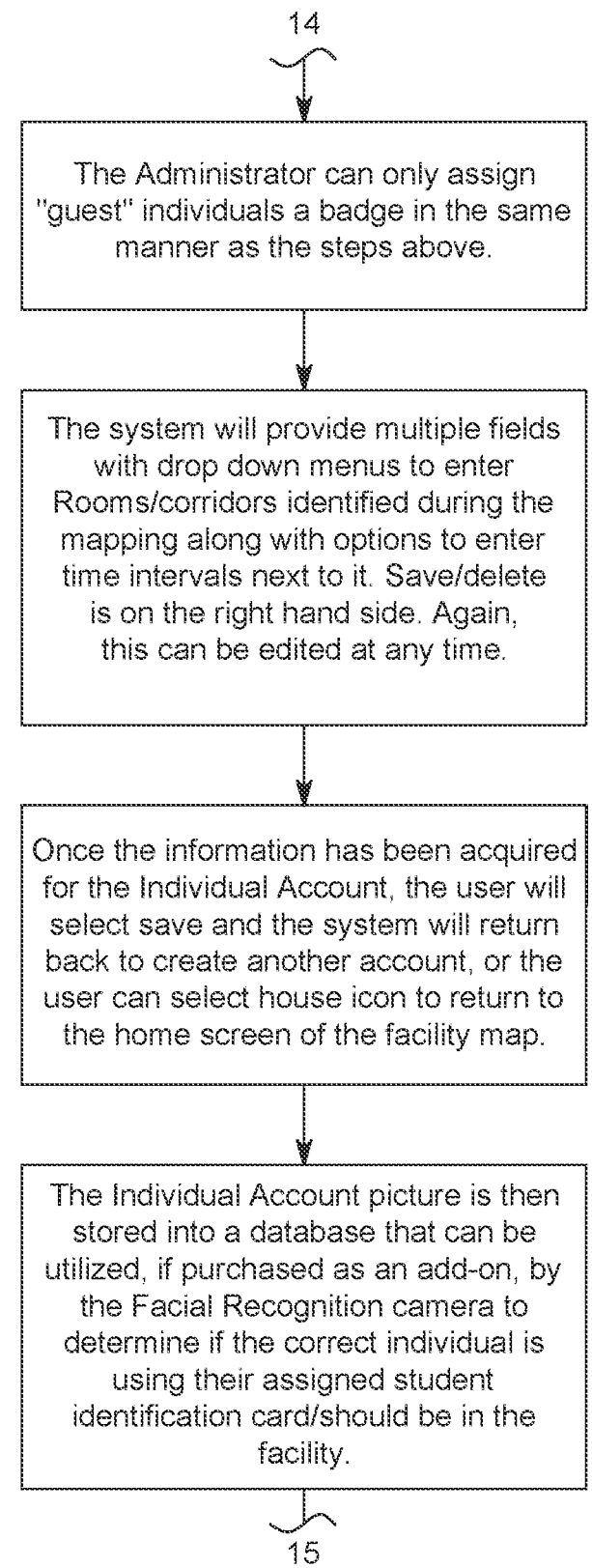
FIG. 1.14

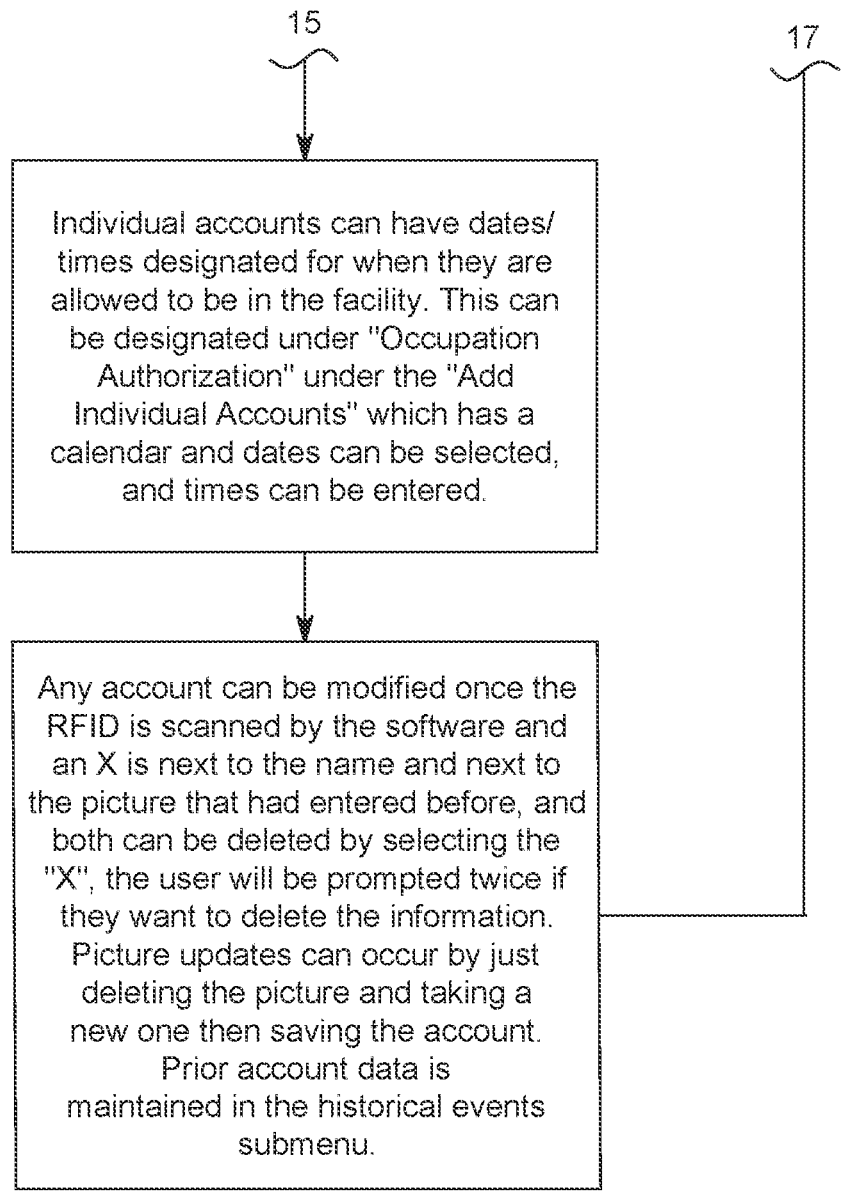
FIG. 1.15

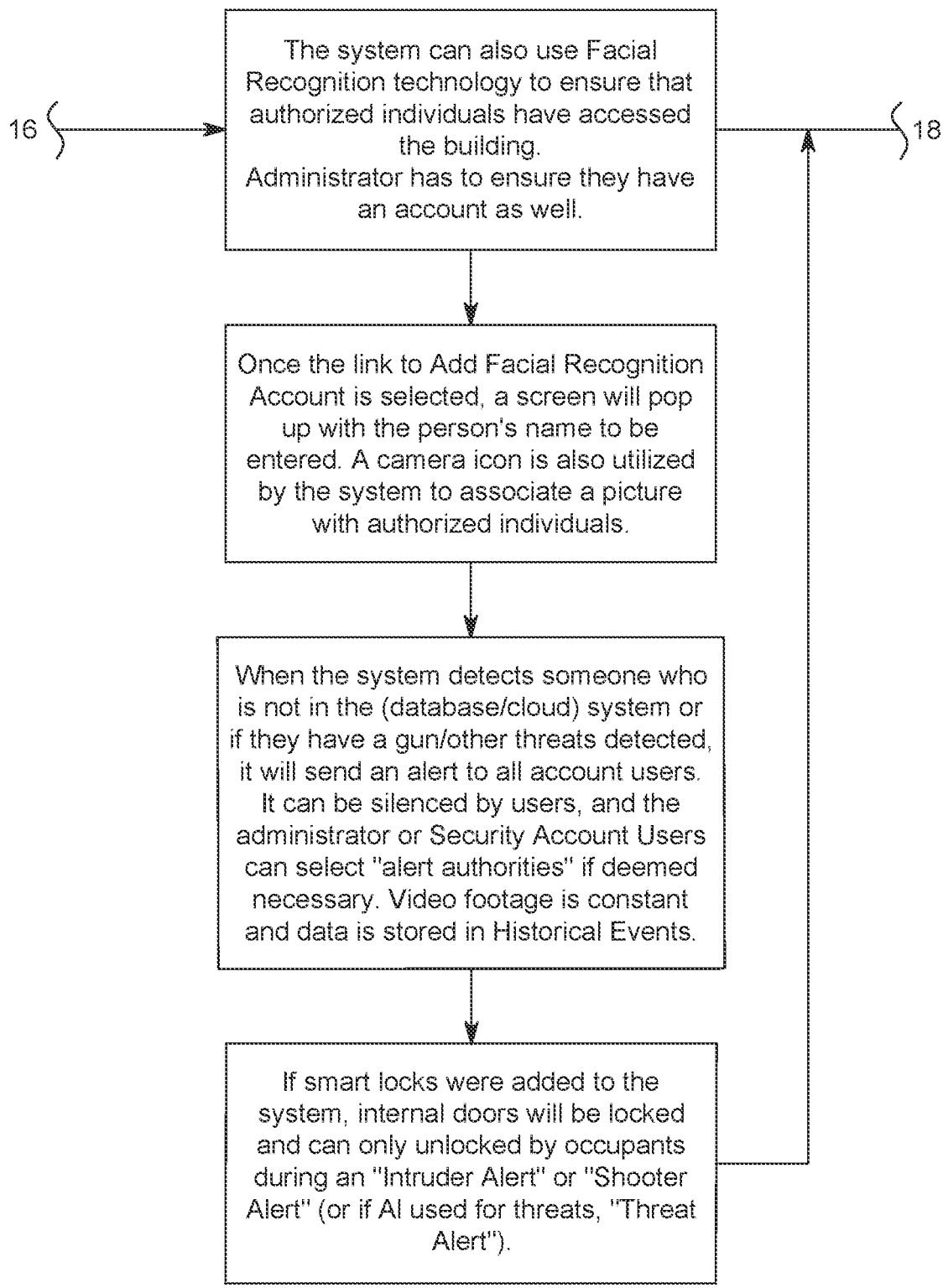
FIG. 1.16

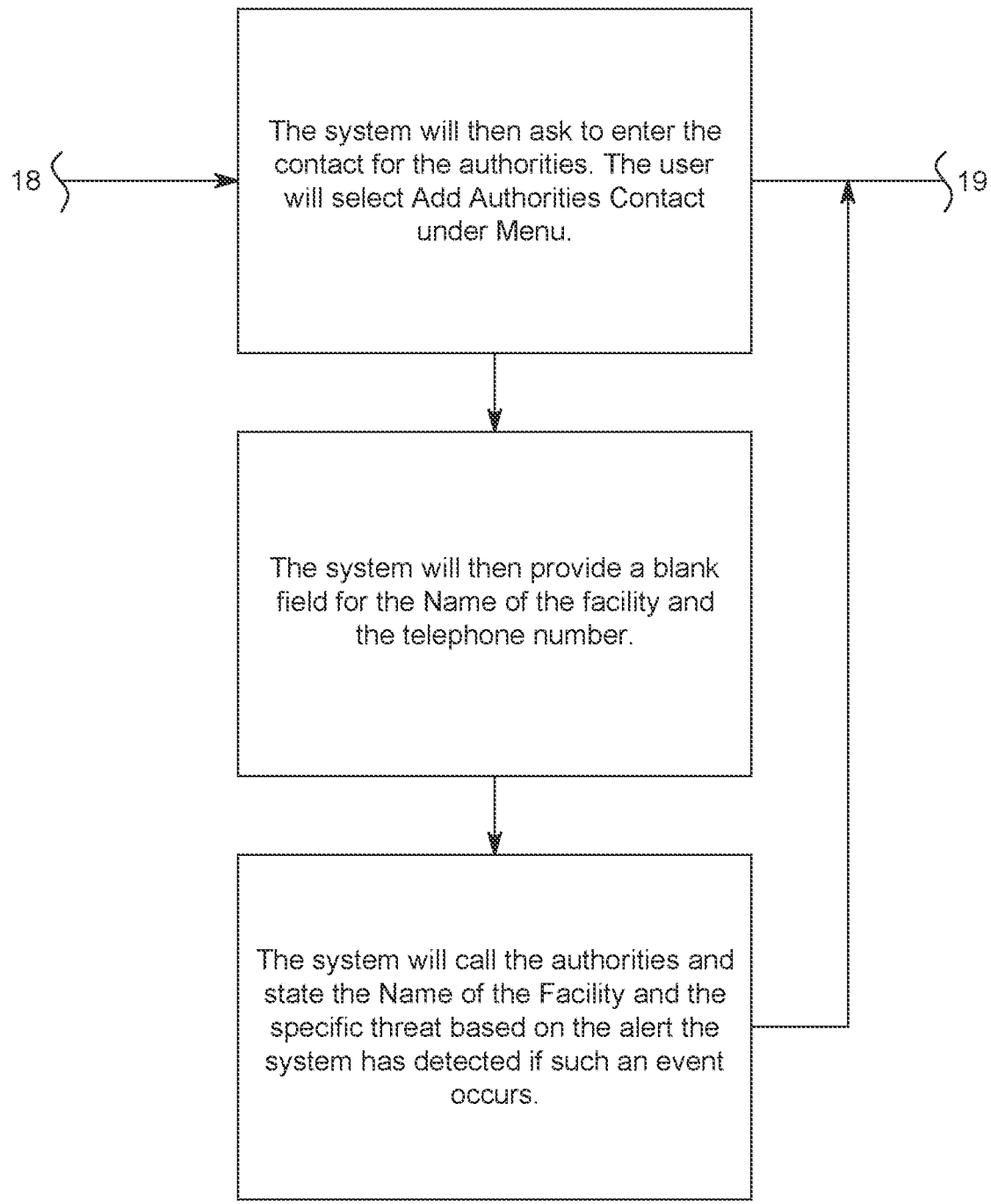
FIG. 1.17

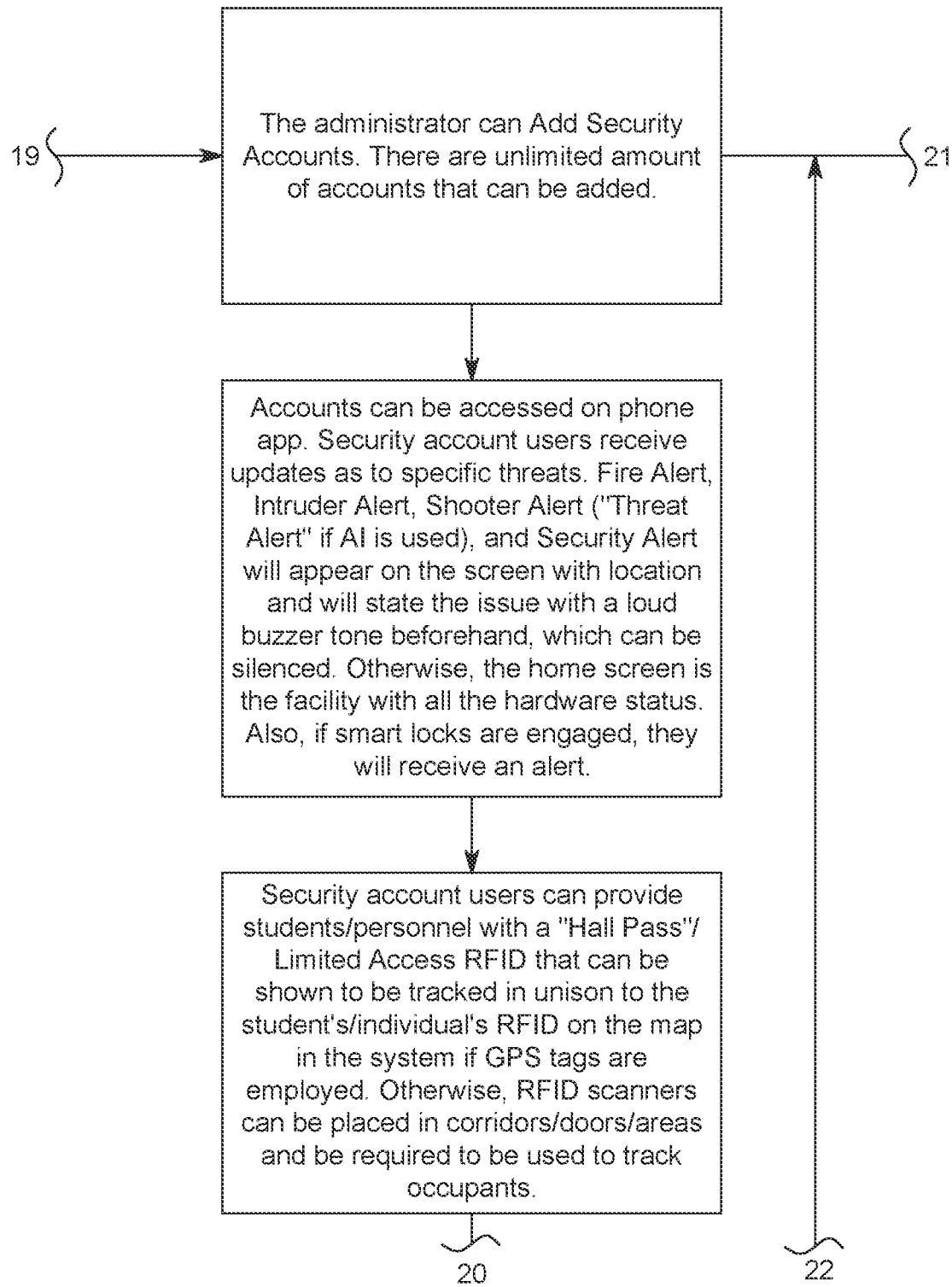
FIG. 1.18

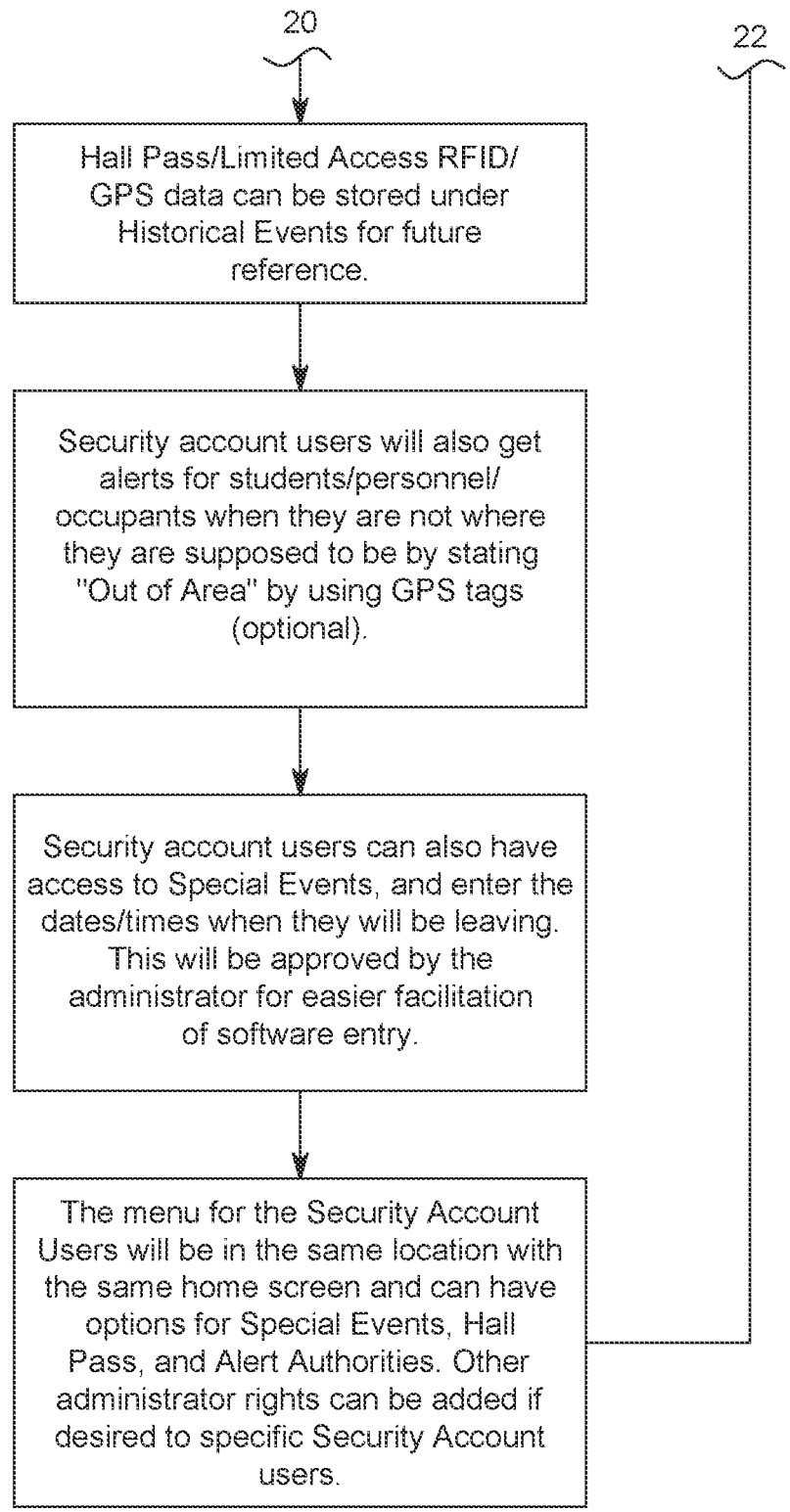
FIG. 1.19

21 → Once the system is set up, the administrator's main/home screen shows the map of the facility showing current status of all hardware, i.e., door/window alarms, cameras, the RFID reader and facial recognition reader, fire detectors, smart locks, fire extinguisher status, unauthorized people, gun detection (Or AI detection of threats), and can identify if individuals are "Out of Area" and can search for individuals (GPS tags required). Camera live footage can be accessed by selecting the desired camera icon and a window pops up to show live footage.

If am exterior door is opened without a user card, it will trip the sensor to alarm/alert the Administrator and Security Account Users on the main/home screen. If the door is open for more than a set time interval (chosen by administrator), the system will alarm/alert the Administrator/Security Account Users. The corresponding door alert will display on the map.

23 → When the system alerts to individuals that are not where they are supposed to be, either by RFID door scans, optional GPS tag recognition, or facial recognition, it will be stored in Historical Events. The corresponding individual location alert will display on the map.

25 → The software has a "Quiet mode that can be used when no one is in the facility and that is for security/motion detection and records footage. It will also alert authorities and provide audio/video footage as well as location if there is an unauthorized entry/Shooter Alert situation.

FIG. 1.20

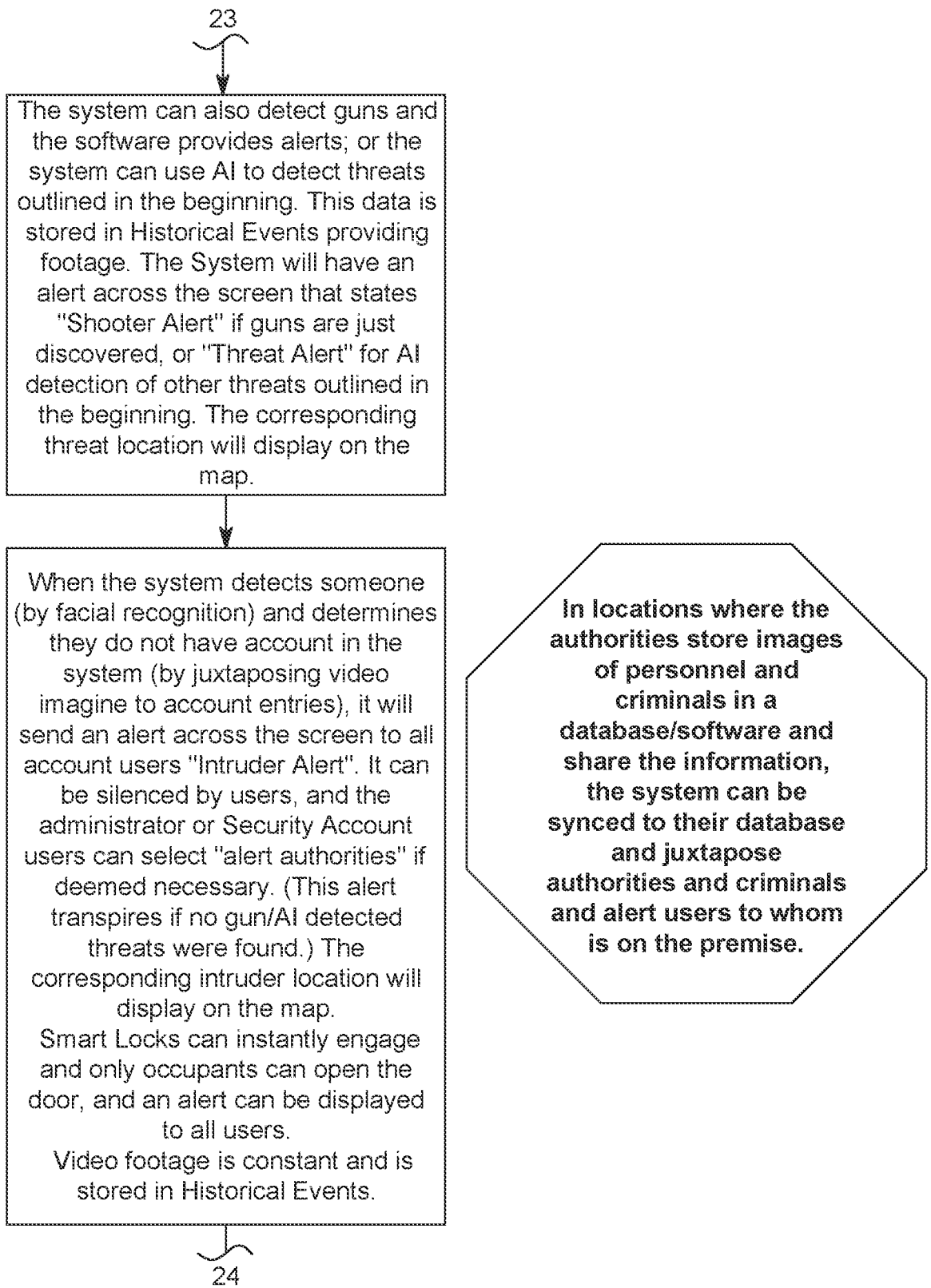
FIG. 1.21

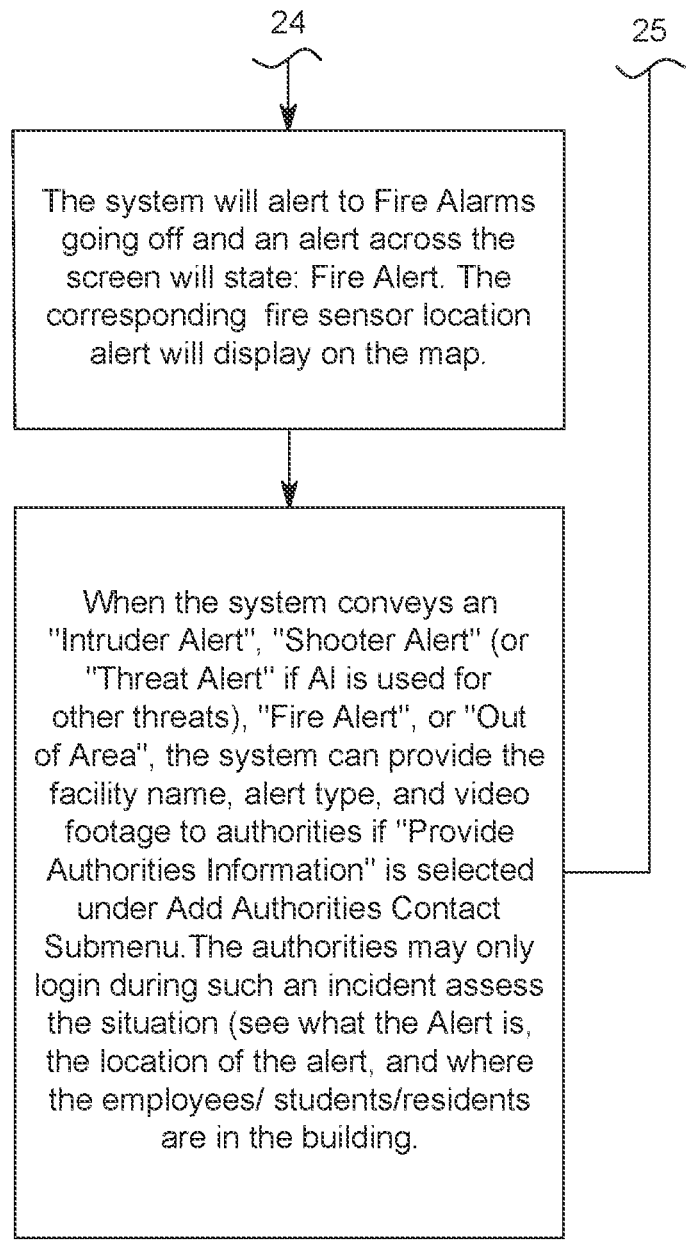
FIG. 1.22

The Multifaceted Home Security System.
This can also be used by latch key kids or the elderly.

This software system may be comprised of RFIDs (either within a card, necklace, bracelet, etc., which can be combined with GPS tags as an option), and RFID pass scanner, security cameras, and security alarms for doors/windows. Add-ons can be fire alarms, geofencing, RFID parking/garage door pass scanner, smart locks, and facial recognition scanners (and anything from the MSS system). The system uses either a database or the cloud.

To set up the system, the software is loaded on the computer/mobile device and the administrator account is first prompted to add a password.

26

After the administrator enters the password twice, a second factor authentication is prompted and required.

NOTE: GPS tags can be an add on feature, as well as geofencing that both can be tracked/controlled by the software.

Alert can be retrofitted to other systems if desired, especially in the event that an alert with sound notification is not desired.

FIG. 2.1

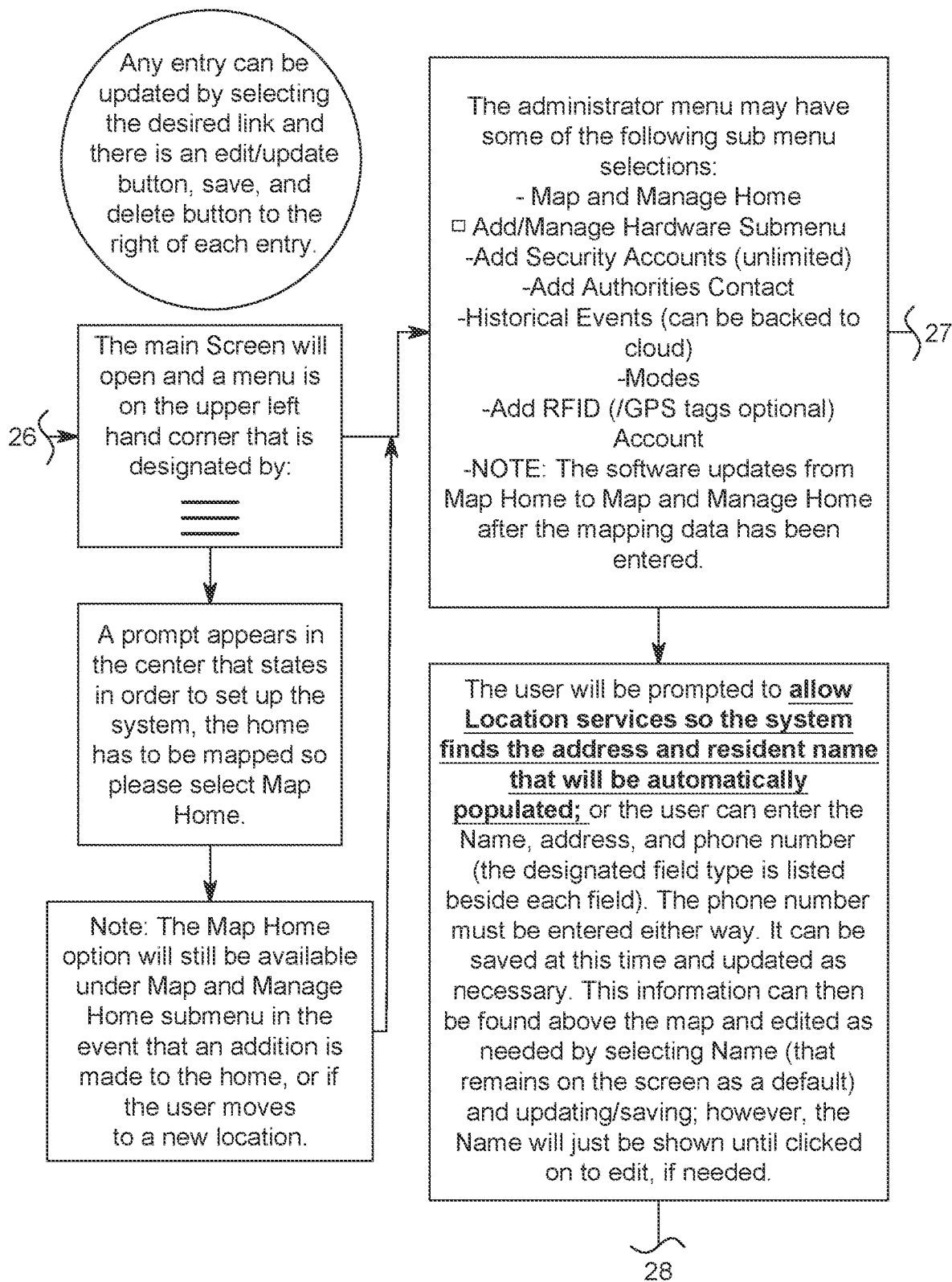
FIG. 2.2

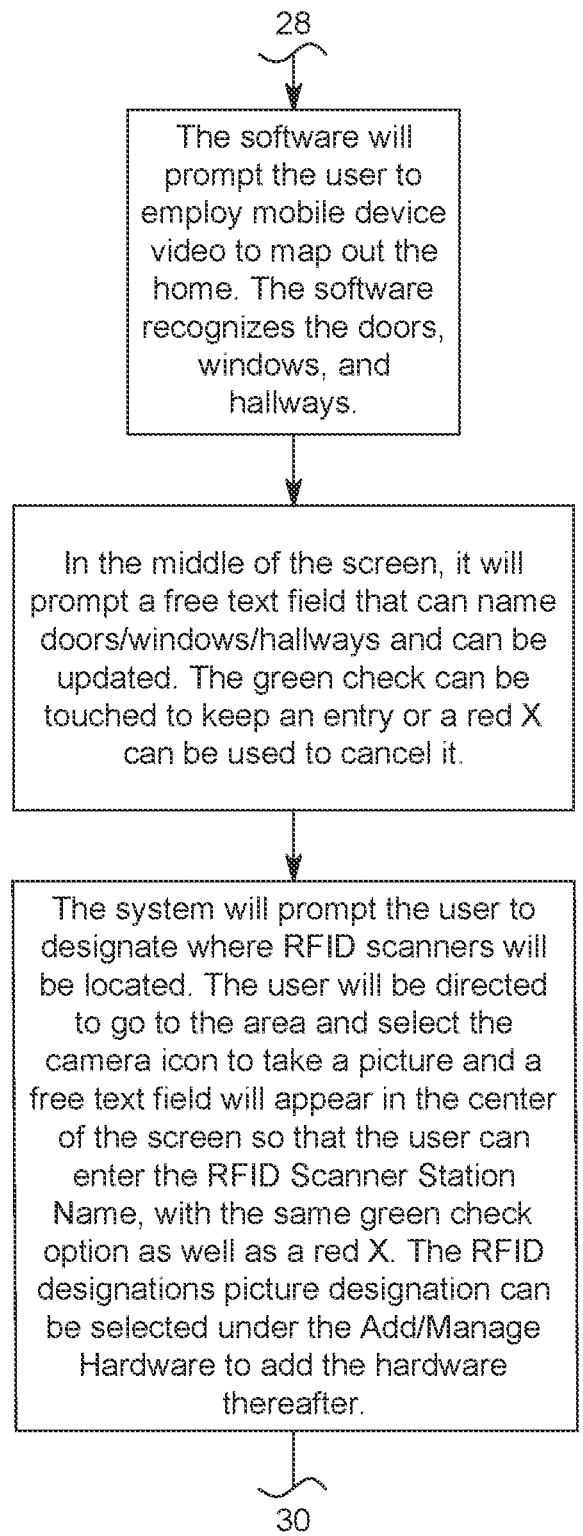
FIG. 2.3

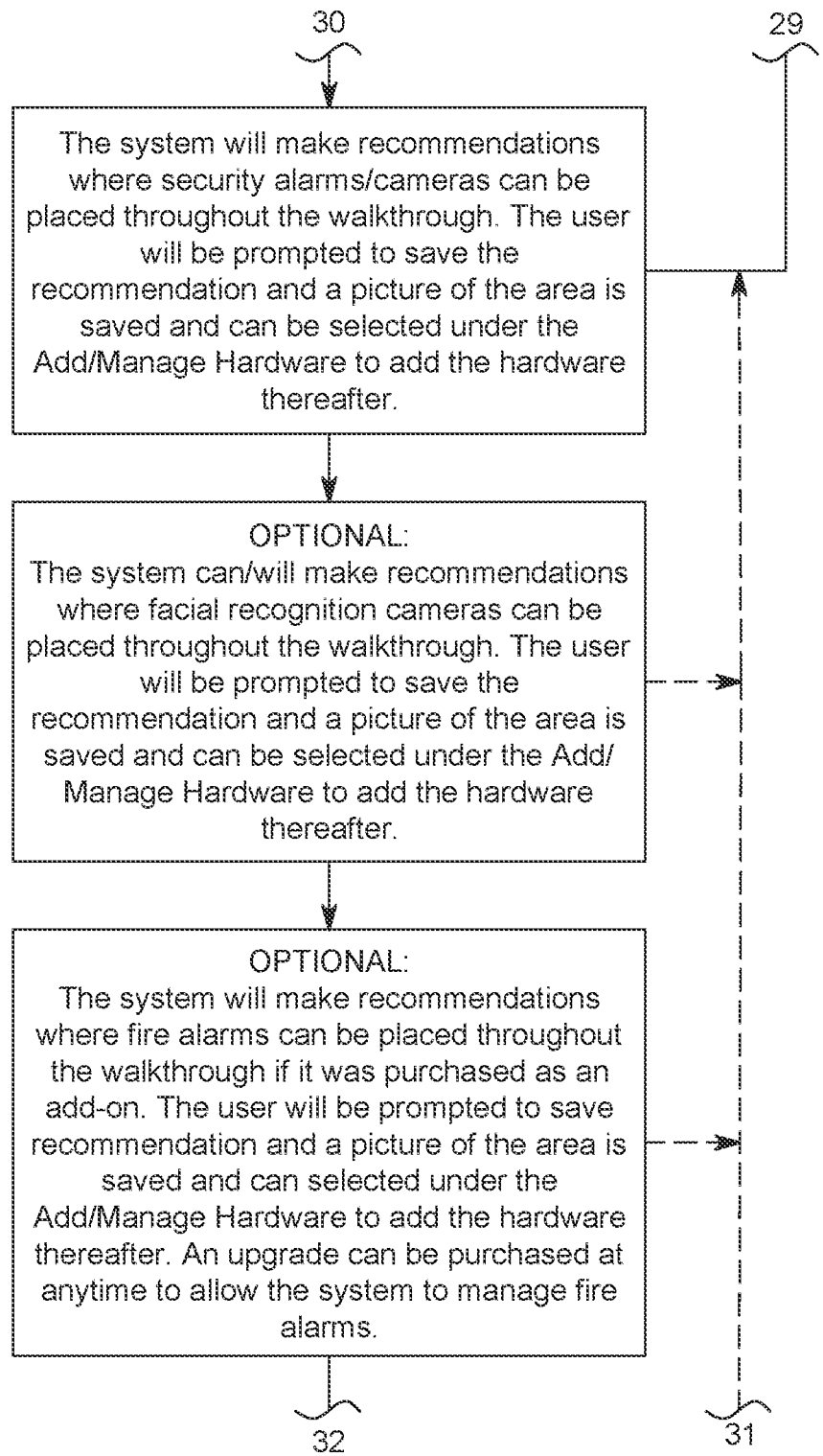
FIG. 2.4

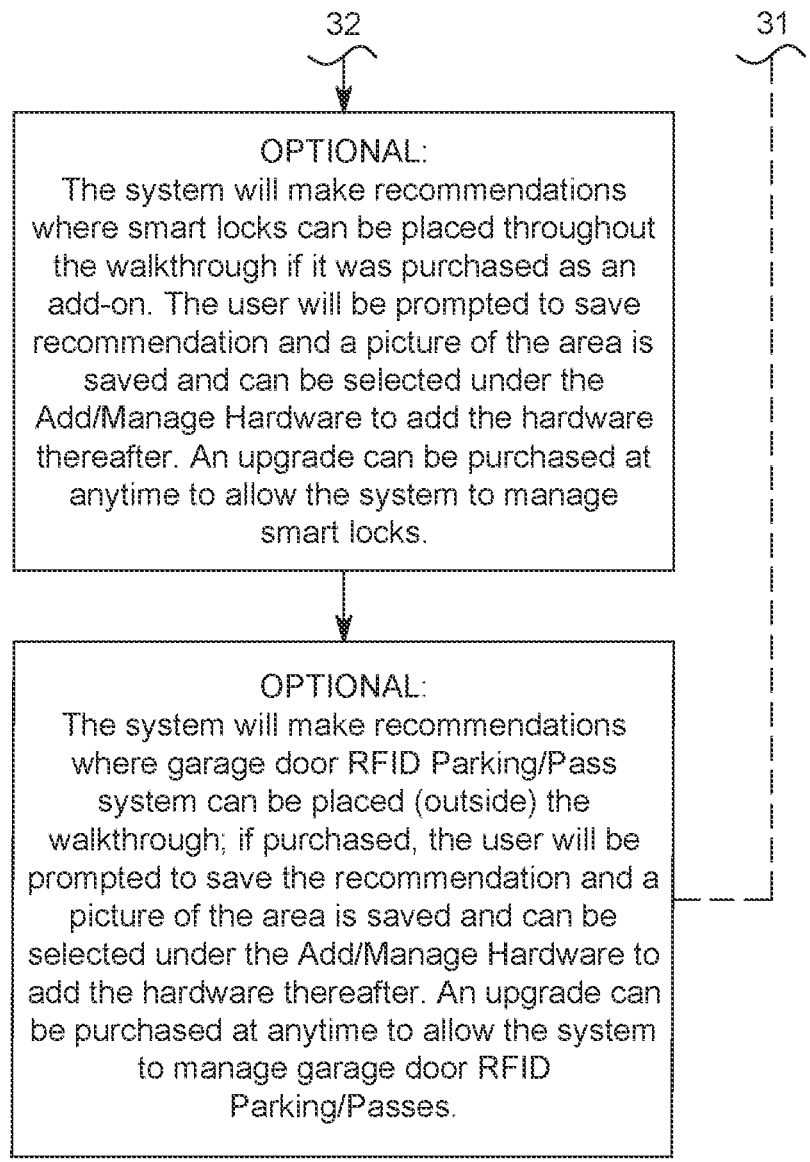
FIG. 2.5

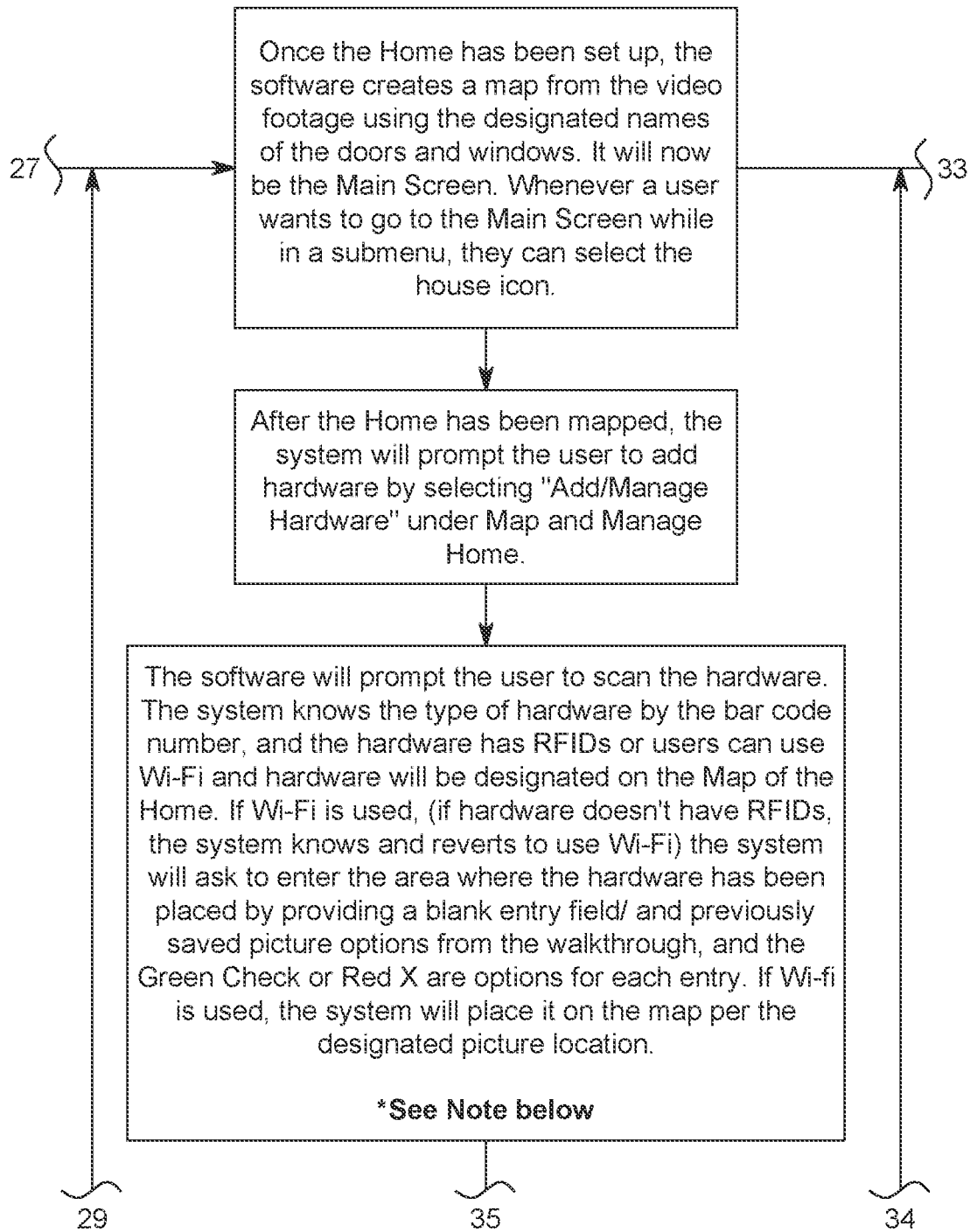
FIG. 2.6

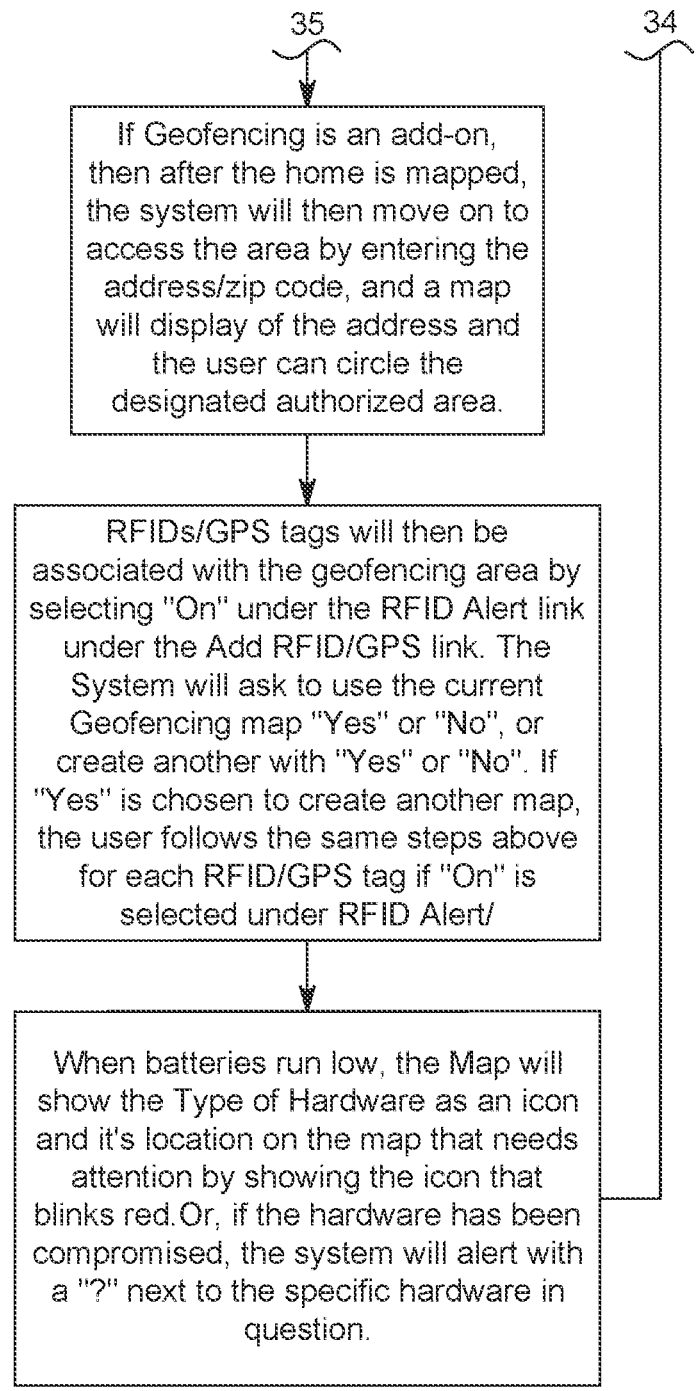
FIG. 2.7

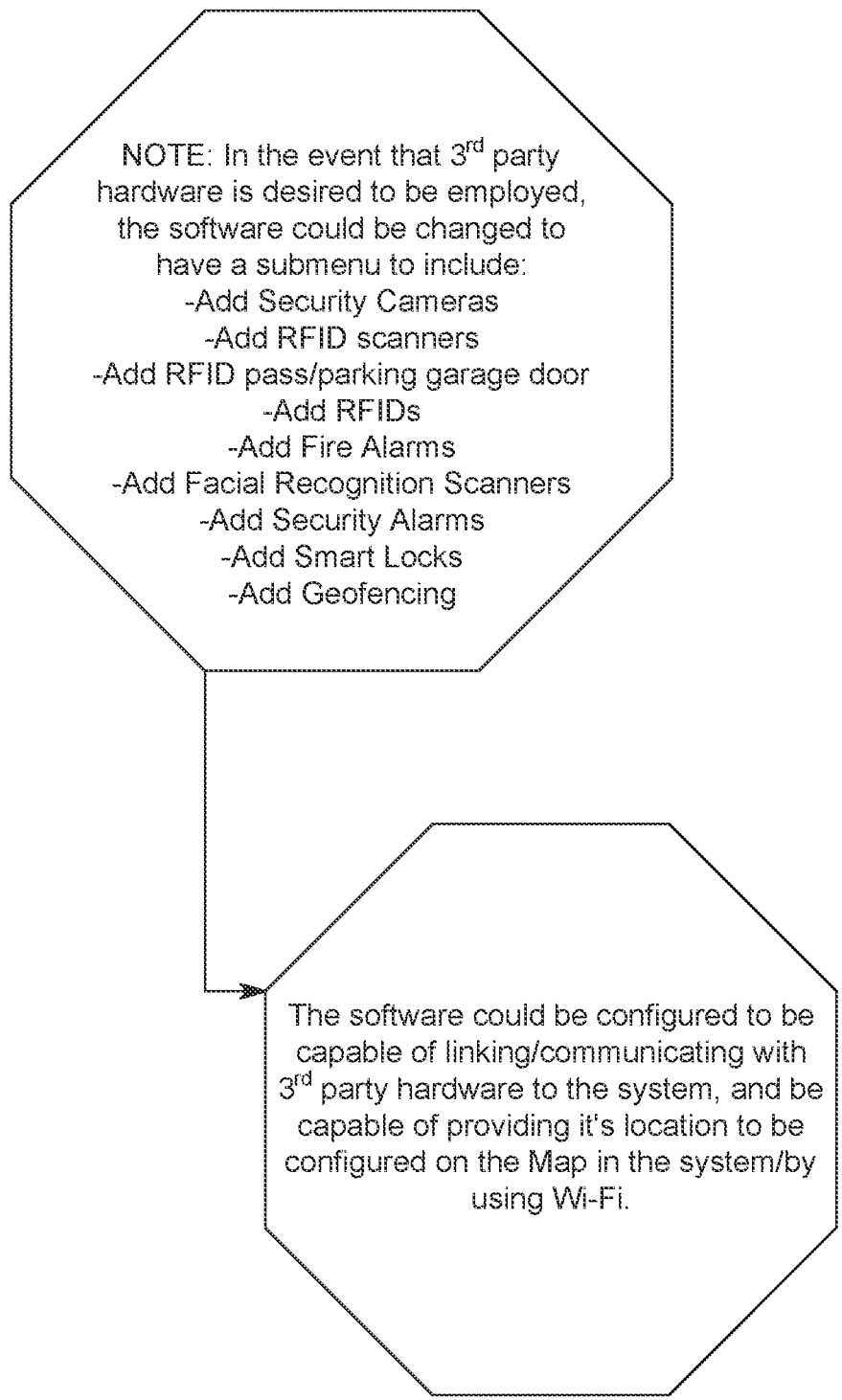
FIG. 2.8

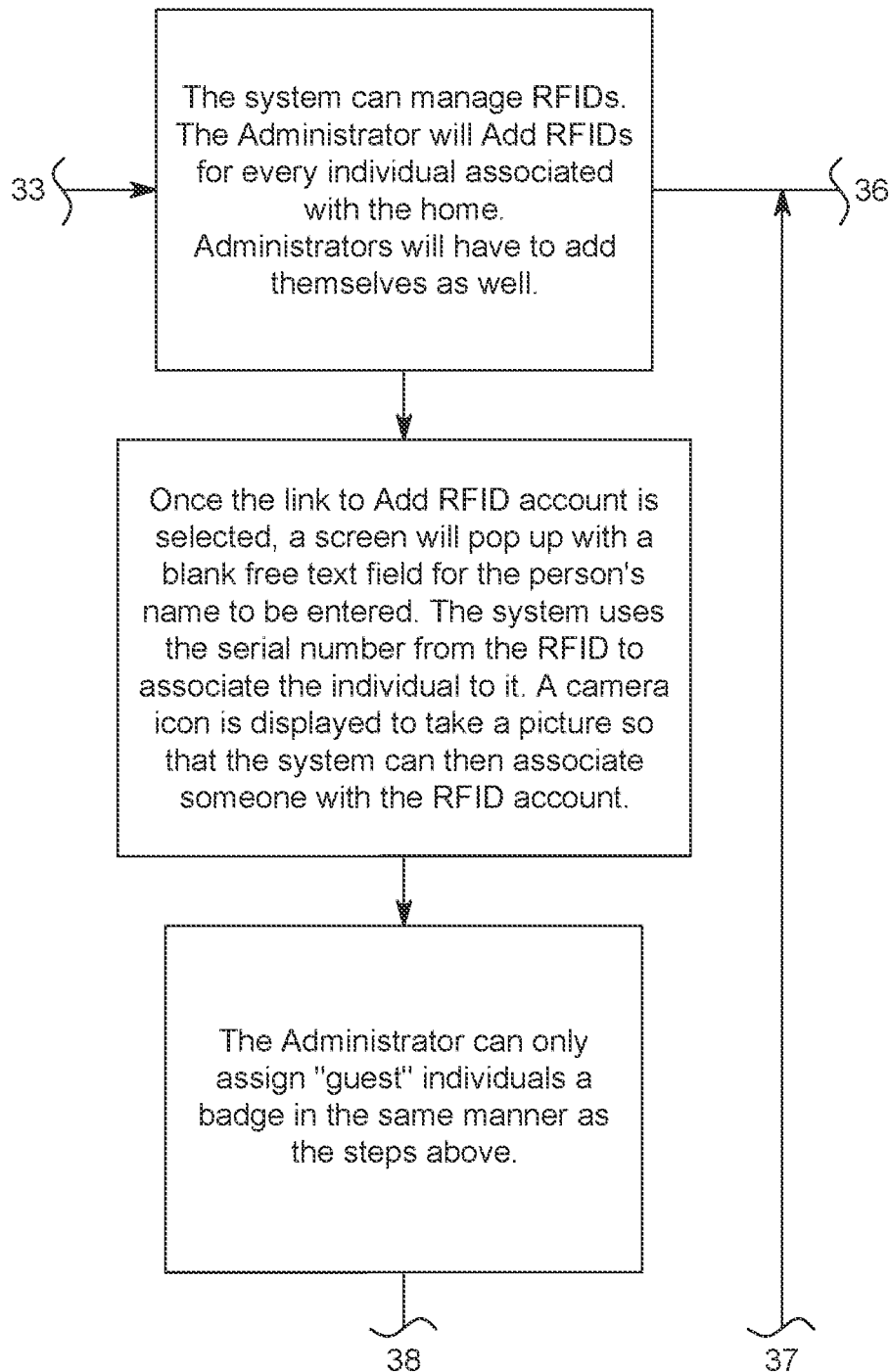
FIG. 2.9

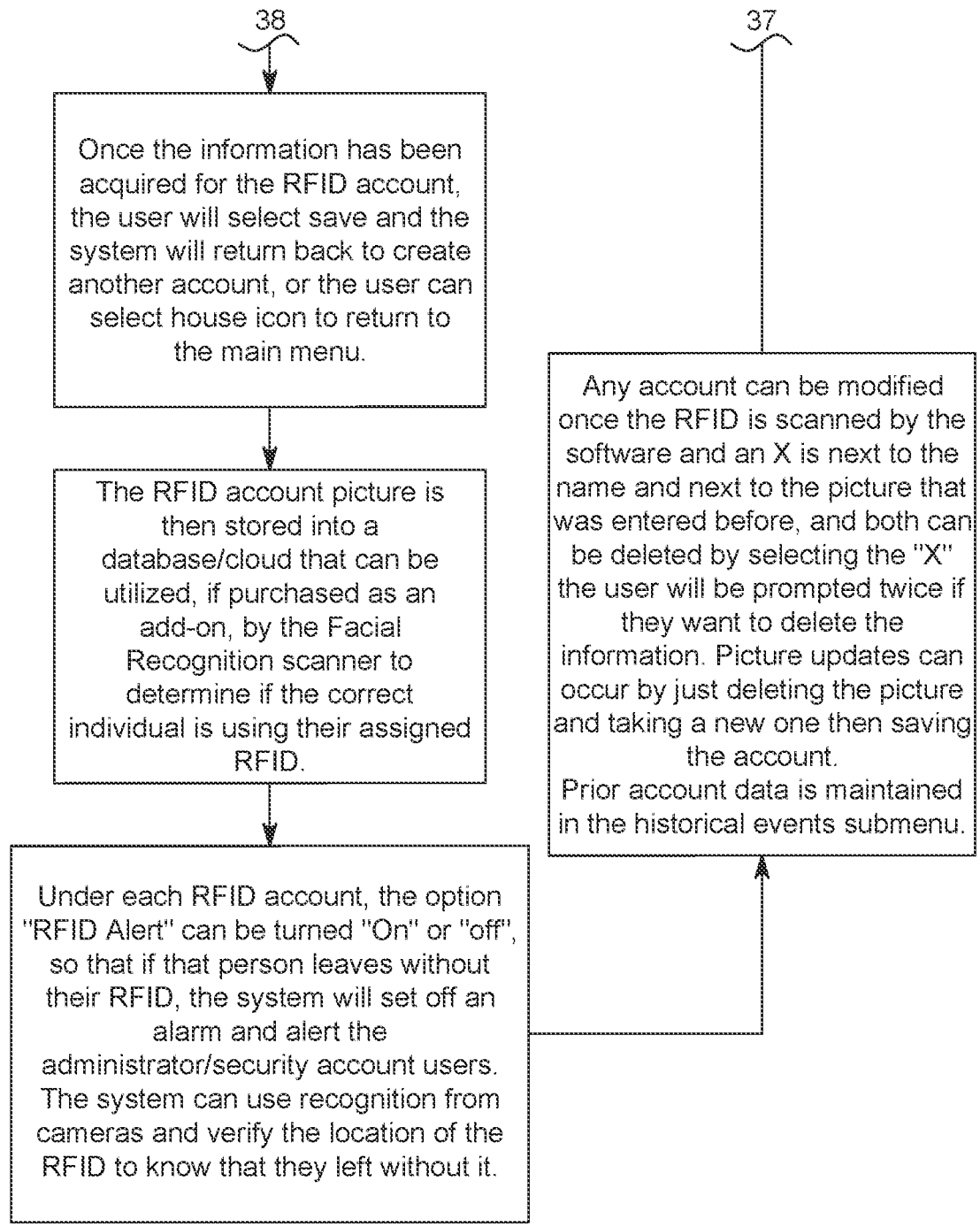
FIG. 2.10

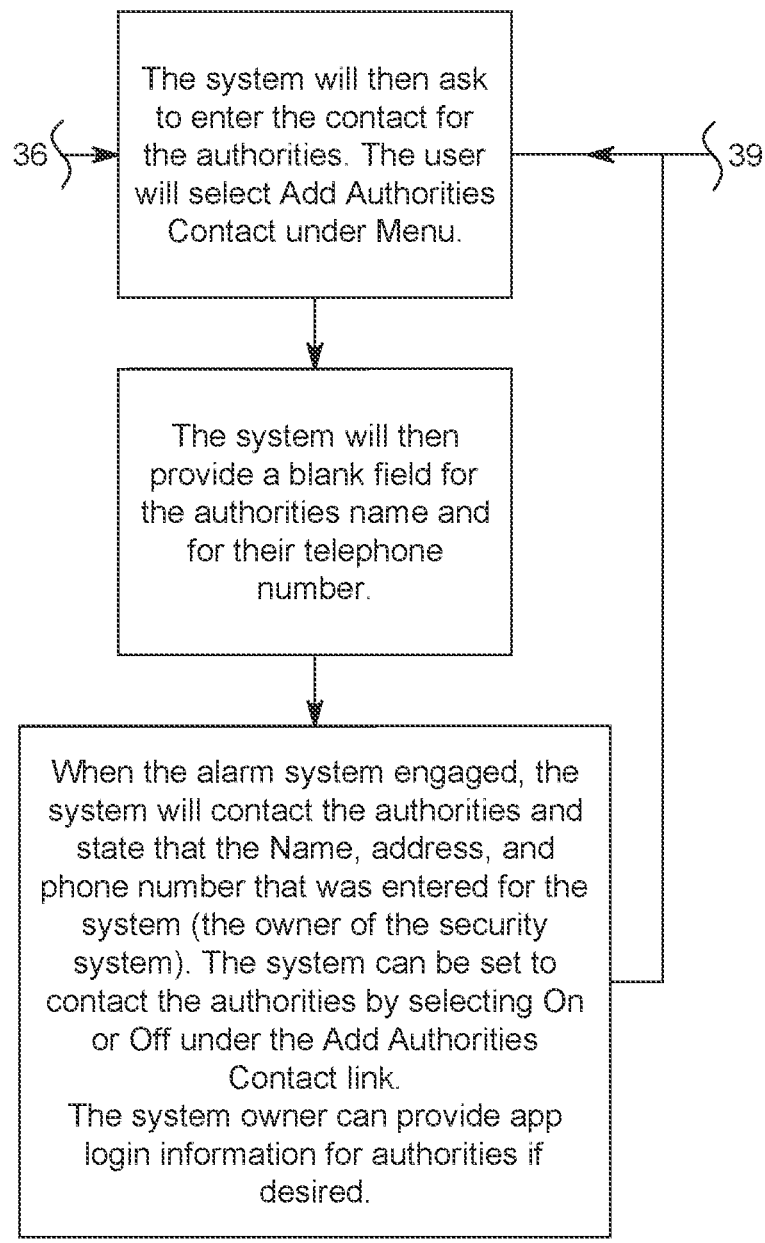
FIG. 2.11

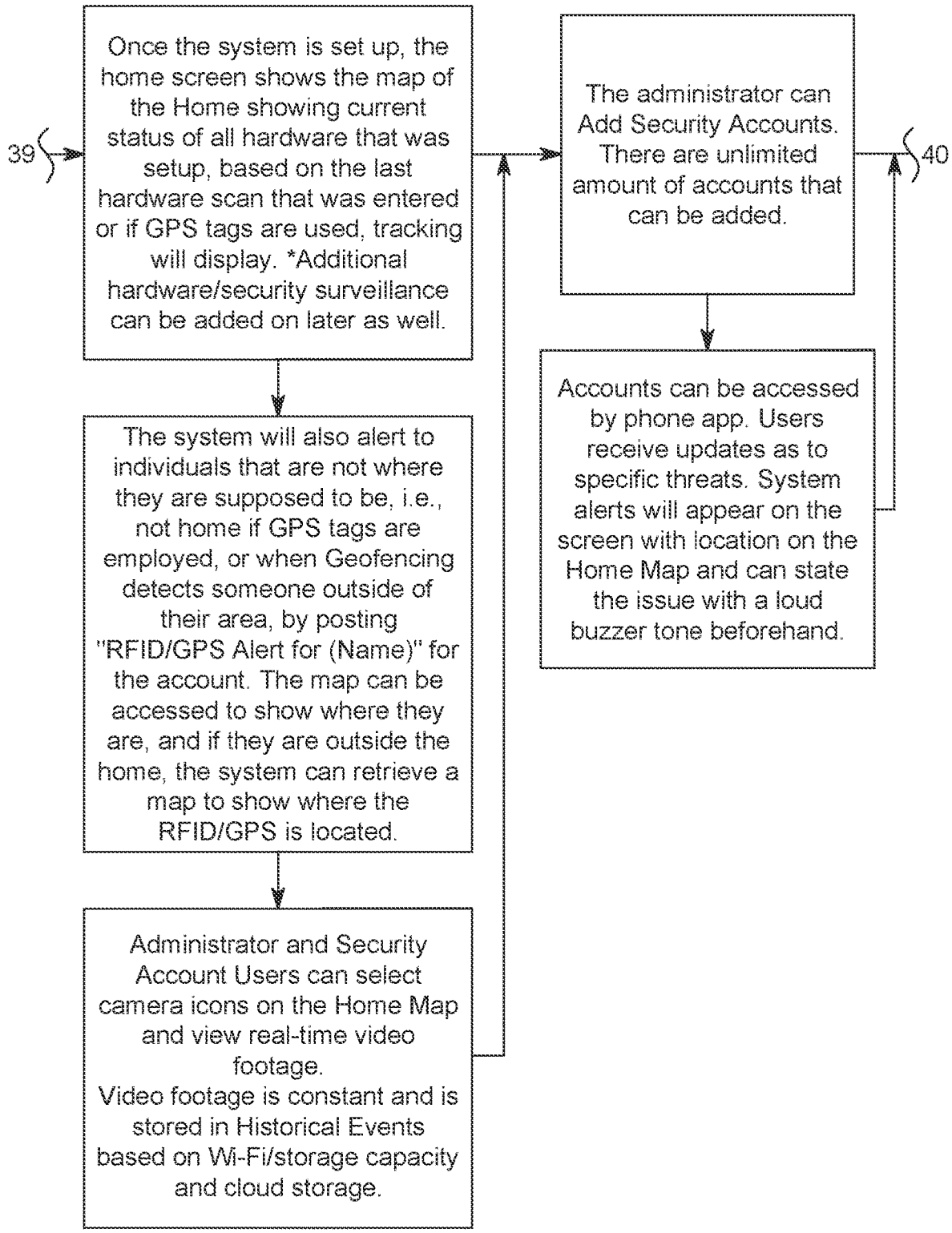
FIG. 2.12

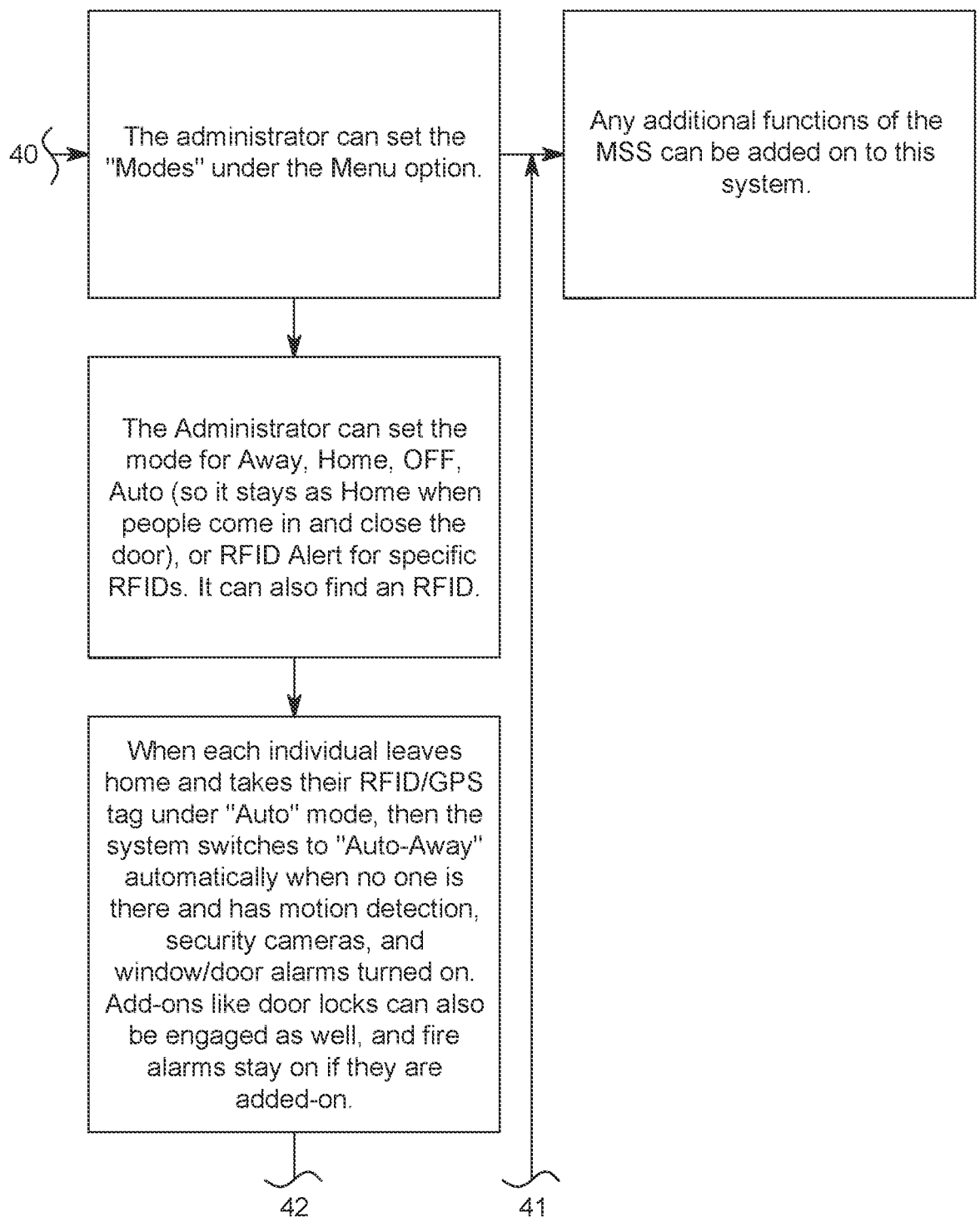
FIG. 2.13

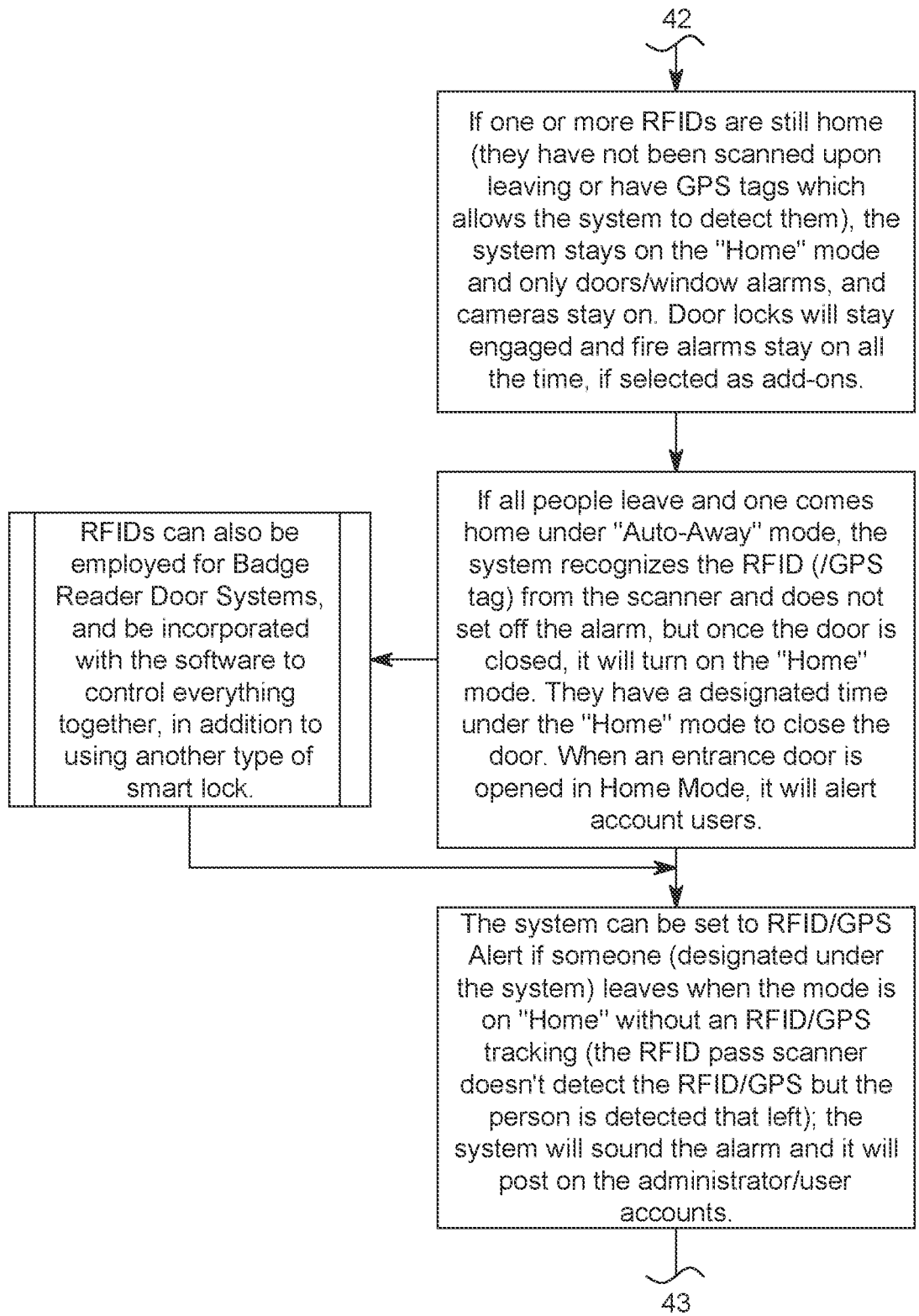
FIG. 2.14

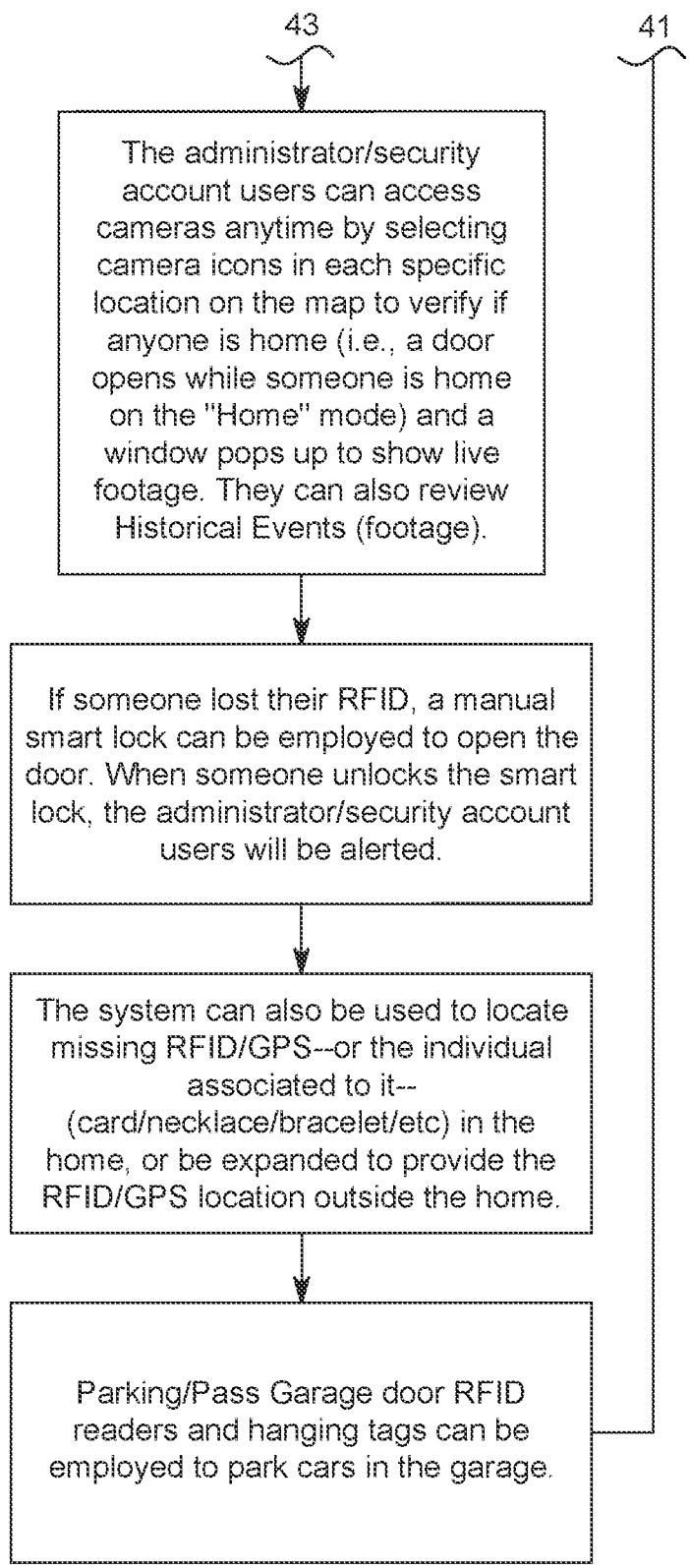
FIG. 2.15

MULTIFACETED SECURITY SYSTEM

CROSS-REFERENCE TO RELATED APPLICATION

This application claims the benefit of priority of U.S. provisional application No. 63/368,200, filed 12 Jul. 2022, the contents of which are herein incorporated by reference.

BACKGROUND OF THE INVENTION

Field of the Invention

The present invention generally relates to a multifaceted security system, and more particularly to a multifaceted security system that employs different types of detection units.

Description of the Related Art

Security systems are widely used in different places to protect personnel and property. For example, security systems are widely used in airports, shopping malls, hotels, commercial buildings, residential buildings, and/or the like. Security systems are mainly used to monitor suspicious or malicious activity and generate an alert when such activities occur. Conventional security systems rely on different detection mechanisms such as video surveillance, Radio Frequency Identification (RFID), facial recognition, etc., which may operate independently to monitor suspicious or malicious activity.

There are known instances of conventional security systems not identifying suspicious or malicious activities in certain scenarios. Therefore, a system is required that may detect suspicious or malicious activities all the time.

SUMMARY OF THE INVENTION

The following presents a simplified summary of the present disclosure in a simplified form as a prelude to the more detailed description that is presented herein.

In accordance with embodiments of the invention, there is provided a surveillance system. The system includes a plurality of detection units configured to monitor activity in a facility. The system further includes a transceiver configured to receive information associated with the facility, and a processor communicatively coupled to the plurality of detection units and the transceiver unit. The processor may be configured to obtain inputs from the plurality of detection units and information from the transceiver. The processor may be further configured to determine potentially malicious/suspicious activity based on the inputs and the information and generate security alert responsive to determination of the activity.

In some embodiments, the information associated with the facility includes video footage of the facility. The processor may be configured to obtain the video footage of the facility, identify one or more facility attributes from the video footage, and generate a map of the facility responsive to identifying the one or more facility attributes.

In some embodiments, the processor may be configured to provide recommendation of positions in the facility to install one or more hardware devices.

In some embodiments, the plurality of detection units includes at least one of: Radio Frequency Identification (RFID) unit, RFID pass scanner, security cameras, security alarms for door/windows, fire alarms, geofencing, RFID parking/garage door pass scanner, smart locks, facial recognition scanners, and Global Positioning System (GPS).

The present disclosure is further directed to a method that may include obtaining, by a processor, inputs from a plurality of detection units and information associated with a facility. The plurality of detection units may be configured to monitor an activity in the facility. The method may further include determining, by the processor, a malicious/suspicious activity based on the inputs and the information, and generating, by the processor, security alert responsive to determination of the activity.

In some embodiments, the method may include performing a predetermined action responsive to determination of the activity. The predetermined action may include transmitting instructions to one or more output units.

In some embodiments, the method may include obtaining the video footage of the facility, identifying one or more facility attributes from the video footage, and generating map of the facility responsive to identifying the one or more facility attributes.

In some embodiments, the method may include combining inputs from the plurality of detection units and determining the malicious activity responsive to combining the inputs.

The present disclosure discloses a multifaceted security system (or the surveillance system) that may track students, patients, residents, or employees for safety, detect intruders, and provide security under one system instead of a group of systems. In addition, the system may locate people if they are not where they are supposed to be. Further, the system may keep people safe by providing alerts for intruders by excluding them from being in their facial recognition database and utilizing security system alarms, gun/weapon detection and may lock interior doors with smart locks and alert to fires. Furthermore, the system uses RFIDs (with additional GPS option) and facial recognition for ensuring safety of people and combines all the systems into one instead of relying on multiple systems. Since the system can also provide the location and monitor threats for intended individuals, it can ensure their safety, such as for patients, the elderly, and minors.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which.

DETAILED DESCRIPTION OF INVENTION

Figure 1:
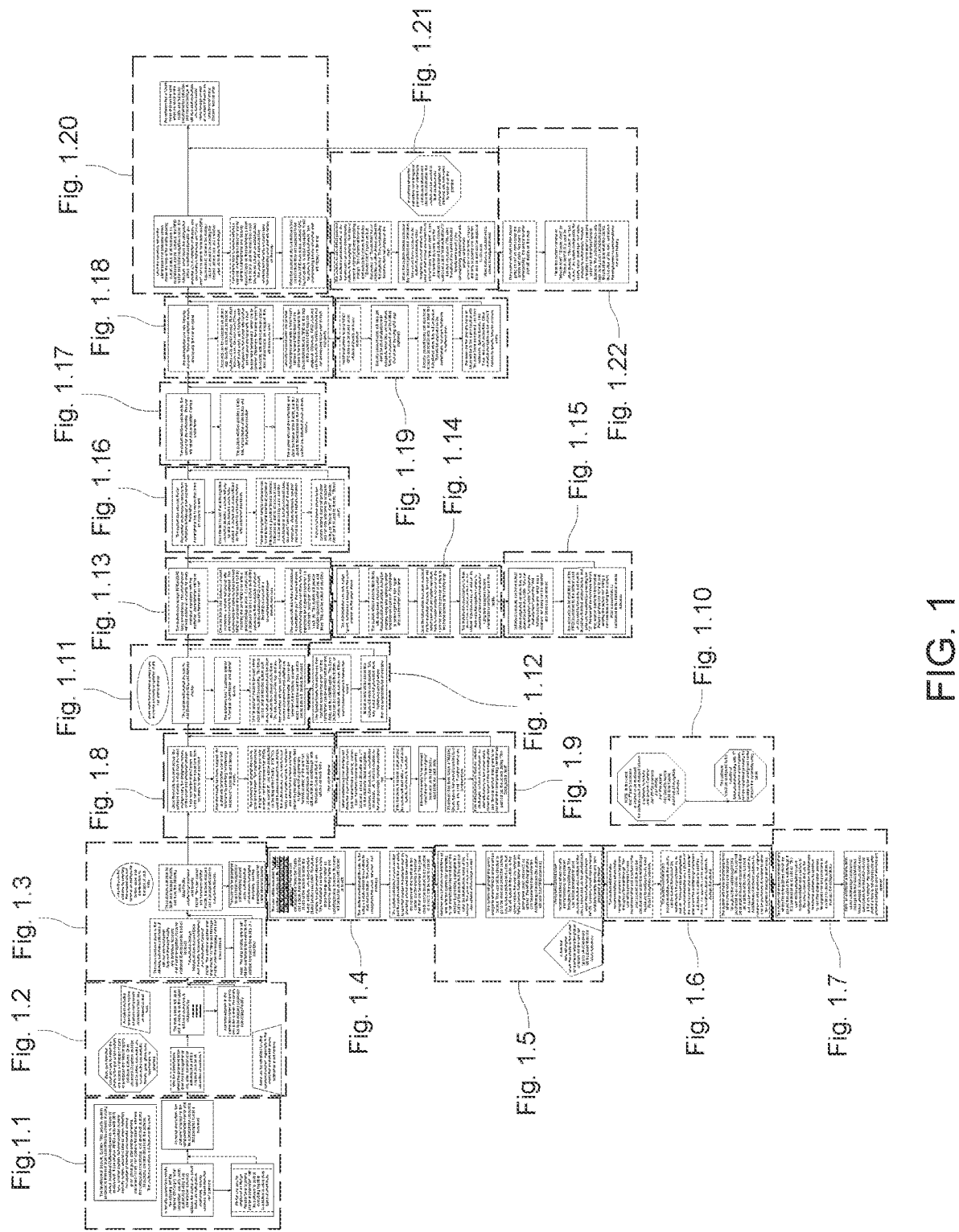
FIG. 1 illustrates use of a multifaceted security/surveillance system intended to provide a secure environment in a residential location, in accordance with the present disclosure, wherein FIG. 1.1 through FIG. 1.22 are, respectively, detailed views of individual components of the multifaceted security/surveillance system illustrated in FIG. 1.

For a further understanding of the nature and function of the embodiments, reference should be made to the following detailed description. Detailed descriptions of the embodiments are provided herein, as well as the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Reference will now be made in detail to the present preferred embodiments of the invention, examples of which are illustrated in the accompanying drawings. Wherever possible, the same reference numerals are used in the drawings and the description to refer to the same or like parts.

FIG. 1 illustrates use of a multifaceted security/surveillance system intended to provide a secure environment in a residential location in accordance with the present disclosure. FIG. 1 is divided into different portions and are labeled as FIG. 1A-10. Each figure is described one-by-one below to explain the process followed by the system to detect malicious/suspicious activities and manage security issues.

In FIG. 1A, a block 101 describes the multifaceted security system (or system) for the first facility. In an exemplary embodiment, the first facility is a home. The system may include (or is coupled with) input/detection units configured to monitor activity in the facility, and output units configured to generate alerts or manage security issues. The input/detection units and the output units may include, but are not limited to, Radio Frequency Identification (RFID), RFID pass scanner, security cameras, security alarms for door/windows, fire alarms, geofencing, RFID parking/garage door pass scanner, smart locks, facial recognition scanners, Global Positioning System (GPS), and/or the like. The system may use a database/memory or a cloud to perform functions described in the present disclosure. In some aspects, the system may be an application (or "app") hosted on a server and may be communicatively coupled with hardware units (e.g., the input/detection units and the output units) such as RFID, facial recognition scanners, etc., described above.

The system may include a transceiver and a processor that may be communicatively coupled with the detection units and the output units. The transceiver may be configured to receive inputs from the detection units and may store the inputs in the database/cloud associated with the system. The transceiver may be further configured to transmit instructions/output to the output units. The processor may be configured to receive inputs from the transceiver and may detect malicious/suspicious activity, intrusion or other security issues based on the inputs. Responsive to detecting a malicious activity, the processor may generate a security alert (e.g., via alert components in the output units). In some aspects, the alert components may be retrofitted to other systems (e.g., when an alert with sound notification is not desired).

Block 102 of FIG. 1A describes that to set up the system, the system may be loaded/installed on a user device (such as mobile phone, tablet, laptop, and/or the like). Once the system is installed on the user device, the system may prompt to add a password for an administrator account. In some aspects, the system may request an administrator to enter the password twice.

Block 103 of FIG. 1A describes that once the administrator enters the password twice, the system prompts a second factor authentication. The administrator may complete the second factor authentication to move to next step. Any entry may be updated by selecting a desired link in the system. Further, the system may include different click buttons (e.g., to the right of each entry) including an edit/update button, a save button, a delete button to perform respective operations.

Block 104 of FIG. 1B describes that when the administrator completes the authentication process, the system may display a main screen (or open the main screen) on a user interface of the user device. The main screen may include a menu (e.g., an administrator menu) on the upper left-hand corner, which may be designated by three horizontal lines.

Block 105 of FIG. 1B describes that a prompt may appear in a center that states that in order to set up the system, the facility has to be mapped. In some aspects, a map home option may be available under "Map and Manage Home" submenu in the event that an addition is to be made to the home, or if the user moves to a new location, as described in block 106.

Block 107 of FIG. 1B describes that the administrator menu may have some of the following sub-menu selections including, but not limited to, Map and Manage Home, Add/Manage hardware, Add Security Accounts, Add Authorities, Historical Events, Modes, Add RFID account (along with GPS tags), and/or the like. The administrator may select any sub-menu, and may provide administrator/user inputs via the sub-menu described above.

Block 108 of FIG. 1B describes that the system may generate a prompt for the user to allow location services so that the system finds the address and resident name that may be automatically populated. In some aspects, the user may manually enter address information (name, address etc.) and contact details (such as mobile number). Such information may be found above the map and edited as needed by selecting name and updating/saving. However, the name may just be shown until the user clicks on edit.

Block 109 of FIG. 1C describes that the system may prompt the user to employ mobile/user device video to map out to the facility. The system may receive the video and may recognize/identify facility attributes such as doors, windows, and hallways (e.g., by using Artificial Intelligence based image processing algorithms). In some aspects, the system may recognize the doors, windows, and hallways in real-time while receiving the video.

Block 110 of FIG. 1C describes that the system may prompt a free text field in middle of a screen of the user device (e.g., while receiving the video), which may be used to add name to (or designate) doors/windows/hallways (which may be updated). A green check may be touched to keep an entry or a red "X" may be used to cancel it.

Block 111 of FIG. 1C describes that the system may prompt the user to designate where RFID scanners may be located (e.g., responsive to receiving the video or while receiving the video). The system may direct the user to go to the area and request the user to select the camera icon to take a picture. A free text field may appear in the center of the screen so that the user can enter the RFID Scanner Station Name, with the same green check option as well as a red "X" option. Thereafter, RFID picture designations may be selected under the Add/Manage Hardware option to add the hardware.

Block 112 of FIG. 1D describes that the system may make/generate recommendations where security alarms/cameras may be placed throughout the walkthrough (e.g., after receiving the video or while receiving the video). Stated another way, the system may generate recommendations of locations/positions where the security alarms/cameras may be placed. The system may prompt the user to save the recommendation(s). A picture of the area may be selected under the Add/Manage Hardware option to add the hardware thereafter.

Block 113 of FIG. 1D describes that the system may make/generate recommendations where facial recognition cameras may be placed throughout the walkthrough. Stated another way, the system may generate recommendations of locations/positions where the facial recognition cameras may be placed. The system may prompt the user to save the recommendation(s). A picture of the area may be selected under the Add/Manage Hardware option to add the hardware thereafter.

Block 114 of FIG. 1D describes that the system may similarly make/generate recommendations where fire alarms may be placed throughout the walkthrough. The system may prompt the user to save the recommendations. A picture of the area may be selected under the Add/Manage Hardware option to add the hardware thereafter. In some aspects, the system may be upgraded to allow the system to manage the fire alarms.

Block 115 of FIG. 1E describes that the system may similarly make/generate recommendations where smart locks may be placed throughout the walkthrough. The system may prompt the user to save the recommendations. A picture of the area may be selected under the Add/Manage Hardware option to add the hardware thereafter. In some aspects, the system may be upgraded to allow the system to manage the smart locks.

Block 116 of FIG. 1E describes that the system may similarly make/generate recommendations where garage door RFID Parking/Pass system may be placed throughout the walkthrough. The system may prompt the user to save the recommendations. A picture of the area may be selected under the Add/Manage Hardware option to add the hardware thereafter. In some aspects, the system may be upgraded to allow the system to manage the garage door RFID Parking/Passes.

Block 117 of FIG. 1F describes that once the home has been set up (e.g., as described in block 107 and/or after providing recommendation to position/dispose the hardware), the system creates a map from the video footage using the designated names of the doors and windows. The set-up home map may be the Main Screen. Whenever the user desires to go to the Main Screen while in a submenu, the user may select the house icon.

Block 118 of FIG. 1F describes that after the system maps the home, the system may add hardware by selecting "Add/Manage hardware" option under the Map and Manage Home.

Block 119 of FIG. 1F describes that the system may prompt the user to scan the hardware. The system knows the type of hardware by the bar code number, and the hardware has RFIDs or users may use Wi-Fi and hardware may be designated on the Map of the Home. If Wi-Fi is used (if hardware doesn't have RFIDs, the system knows and reverts to use Wi-Fi), the system may ask to enter the area where the hardware has been placed by providing a blank entry field/ and previously saved picture options from the walkthrough, and the Green Check or Red X are options for each entry. If Wi-Fi is used, the system may place it on the map as per the designated picture location.

Block 120 of FIG. 1G describes that if geofencing is an add-on, then after the home is mapped, the system may then move on to access the area by entering the address/zip code, and a map may display the address and the user can circle the designated authorized area.

Block 121 of FIG. 1G RFIDs/GPS tags may then be associated with the geofencing area by selecting "ON" under the RFID Alert link under the Add RFID/GPS link. The System may ask the user to use the current Geofencing map "Yes" or "No", or create another with "Yes" or "No". If "Yes" is chosen by the user to create another map, the user follows the same steps above for each RFID/GPS tag if "ON" is selected under RFID Alert.

Block 122 of FIG. 1G describes that when batteries run low, the Map may show the Type of Hardware as an icon and its location on the map that needs attention by showing the icon that blinks red. Further, if the hardware has been compromised, the system may alert with a "?" next to the specific hardware in question.

Block 123 of FIG. 1H describes that in the event that third party hardware is desired to be employed, the software could be changed to have a submenu to include, but not limited to, Add Security Cameras, Add RFID scanners, Add RFID pass/parking garage door, Add RFIDs, Add Fire Alarms, Add Facial Recognition Scanners, Add Security Alarms, Add Smart Locks, Add Geofencing, and/or the like.

Block 124 of FIG. 1H describes that the system may be configured to link/communicate to the third party hardware to the system, and provide its location (to be configured on the Map in the system/by using Wi-Fi).

Block 125 of FIG. 1I describes that the system may manage RFIDs (e.g., after creating the map, as described in block 117). The Administrator may Add RFIDs for every individual associated with the home.

Block 126 of FIG. 1I describes that once the link to Add RFID account is selected by the user (e.g., the administrator), a screen may pop up with a blank free text field for the person's name to be entered. The system may use the serial number from the RFID to associate the individual to it. A camera icon may be displayed to take a picture so that the system may then associate someone with the RFID account.

Block 127 of FIG. 1I describes that the user/administrator may only assign "guest" individuals a badge in the same manner as the steps above.

Block 128 of FIG. 1J describes that once the system acquires information for the RFID account, the user may select save and the system may return to create another account (for another individual), or the user may select house icon to return to the main menu.

Block 129 of FIG. 1J describes that the RFID account picture may then be stored into a database/cloud that can be utilized, if purchased as an add-on, by the Facial Recognition scanner to determine if the correct individual is using their assigned RFIDs.

Block 130 of FIG. 1J describes that under each RFID account, the option "RFID Alert" may be turned "On" or "Off", so that if that person leaves without their RFID, the system may set off an alarm and alert the administrator/security account users. The system may use recognition from cameras and verify the location of the RFID to know that they left without it.

Block 131 of FIG. 1J describes that any account may be modified once the RFID is scanned by the system and an "X" is next to the name and next to the picture that was entered before. In some aspects, both may be deleted by selecting the "X". Further, the user may be prompted twice if the user wants to delete the information. Picture updates may occur by just deleting the picture and taking a new one, and then saving the account. Prior account data is maintained in the historical events submenu.

Block 132 of FIG. 1K describes that the system may ask the user to enter the contact for the authorities (e.g., after the user adds RFIDs for every individual, as described in block 125). The user may select Add Authorities Contact option under Menu. Block 133 of FIG. 1K describes that the system may provide a blank field for authorities' name and their telephone number.

Block 134 of FIG. 1K describes that when the alarm system is engaged, the system may contact the authorities and state the Name, address, and phone number that was entered for the system (the owner of the security system). The system may be set to contact the authorities by selecting "On" or "Off" under the Add Authorities Contact link. The system owner may provide app login information to the authorities if desired.

Block 135 of FIG. 1L describes that once the system is set up, the home screen shows the map of the Home showing current status of all hardware that was setup, based on the last hardware scan that was entered or if GPS tags are used, tracking will display. Additional hardware/security surveillance may be added on later as well.

Block 136 of FIG. 1L describes that the system may also alert individuals that are not where they are supposed to be, i.e., not home if GPS tags are employed, or when Geofencing detects someone outside of their area, by posting "RFID/GPS Alert for (Name)" for the account. The map may be accessed to show where they are, and if they are outside the home, the system may retrieve a map to show where the RFID/GPS is located.

Block 137 of FIG. 1L describes that Administrator and Security Account Users may select camera icons on the Home Map and view real-time video footage. Video footage is constant and is stored in Historical Events based on Wi-Fi/storage capacity and cloud storage.

Block 138 of FIG. 1L describes that the administrator can Add Security Accounts. There are unlimited accounts that may be added.

Block 139 of FIG. 1L describes that the accounts may be accessed by phone app. Users receive updates as to specific threats. System alerts may appear on the screen with location on the Home Map and may state the issue with a loud buzzer tone beforehand.

Block 140 of FIG. 1M describes that the administrator can set the "Modes" under the Menu option.

Block 141 of FIG. 1M describes that the Administrator may set the mode for Away, Home, OFF, Auto (so it stays as Home when people come in and close the door), or RFID Alert for specific RFIDs. It can also find an RFID.

Block 142 of FIG. 1M describes that when each individual leaves home and takes their RFID/GPS tag under "Auto" mode, then the system switches to "Auto-Away" automatically when no one is there and has motion detection, security cameras, and window/door alarms turned ON. Add-ons like door locks may also be engaged, and fire alarms stay ON if they are added-on.

Block 143 of FIG. 1M describes that any additional functions of the managed security services (MSS) may be added on to this system.

Block 144 of FIG. 1N describes that if one or more RFIDs are still home (they have not been scanned upon leaving or have GPS tags which allows the system to detect them), the system stays on the "Home" mode and only doors/window alarms, and cameras stay ON. Door locks may stay engaged and fire alarms stay ON all the time, if selected as add-ons.

Block 145 of FIG. 1N describes that if all people leave and one comes home under "Auto-Away" mode, the system recognizes the RFID (/GPS tag) from the scanner and does not set off the alarm, but once the door is closed, the system may turn on the "Home" mode. They have a designated time under the "Home" mode to close the door. When an entrance door is opened in Home Mode, the system may alert account users.

Block 146 of FIG. 1N describes that RFIDs may also be employed for Badge Reader Door Systems and be incorporated with the system to control everything together, in addition to using another type of smart lock.

Block 147 of FIG. 1N describes that the system may be set to RFID/GPS Alert if someone (designated under the system) leaves when the mode is on "Home" without an RFID/GPS tracking (the RFID pass scanner does not detect the RFID/GPS but the person is detected that left); the system may generate the alarm and the system may post on the administrator/user accounts.

Block 148 of FIG. 1O describes that the administrator/security account users may access cameras anytime by selecting camera icons in each specific location on the map to verify if anyone is home (i.e., a door opens while someone is home on the "Home" mode) and a window pops up to show live footage. The user may also review Historical Events (footage).

Block 149 of FIG. 1O describes that if someone lost their RFID, a manual smart lock may be employed to open the door. When someone unlocks the smart lock, the administrator/security account users may be alerted.

Block 150 of FIG. 1O describes that the system may also be used to locate missing RFID/GPS or the individual associated to it (card/necklace/bracelet/etc.) in the home, or be expanded to provide the RFID/GPS location outside the home.

Block 151 of FIG. 1O describes that Parking/Pass Garage door RFID readers and hanging tags may be employed to park cars in the garage.

Figure 2:
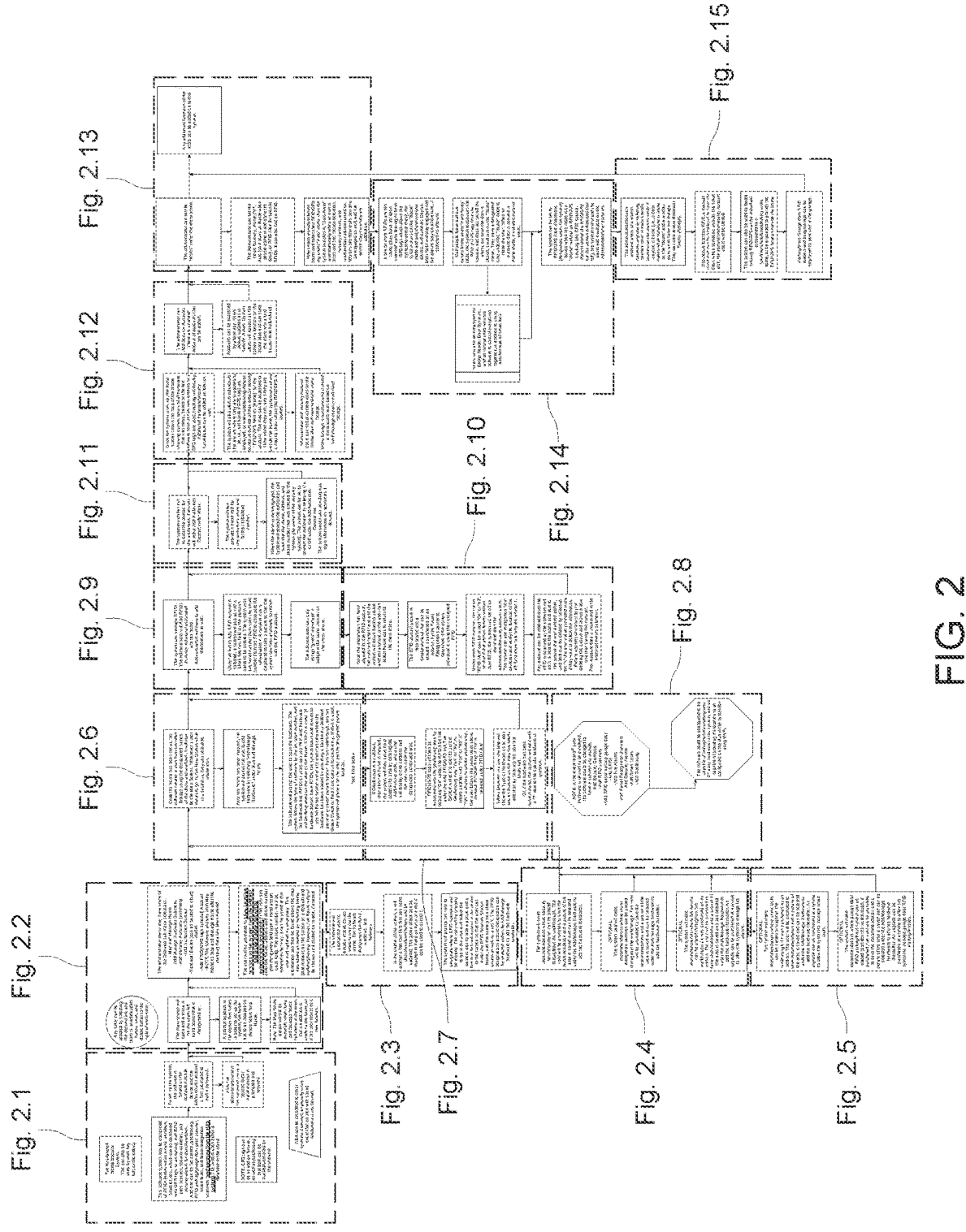
FIG. 2 illustrates use of a multifaceted security/surveillance system to provide a secure environment in a facility, in accordance with the present disclosure, wherein FIG. 2.1 through FIG. 2.15 are, respectively, detailed views of individual components of the multifaceted security/surveillance system illustrated in FIG. 2.

FIG. 2 illustrates use of a multifaceted security/surveillance system to provide secure environment in a facility, in accordance with the present disclosure. FIG. 2 is divided into different portions and is labelled as FIG. 2A-2V. Each figure is described one-by-one below to explain the process followed by the system to detect malicious/suspicious activities and manage security issues.

In FIG. 2A, at block 201 describes a multifaceted security system (or system) for a facility. In an exemplary embodiment, the facility may include, but not limited to, a school, a nursing home, a hospital/ICU/Maternity ward, or a place of employment. In some aspects of the present invention, the multifaceted security system may be the same as the multifaceted security system described above in conjunction with FIG. 1. The multifaceted security system may include (or be coupled with) the input/detection units and the output units. In some aspects, the input/detection units and the output units may include, but are not limited to, RFIDs cards with GPS tags, scanner system, facial recognition scanner, security system (including door and window sensors), security cameras, threat detection system (based on Artificial Intelligence (AI) capable of detecting non-metallic threats, guns, ghost guns, pipe bombs or powders, concealed or not, or any other basic gun detection), fire alarms, wireless fire extinguisher monitoring system, smart lock systems, and/or the like.

Block 202 of FIG. 2A describes that RFIDs may also be employed for Badge Reader Door Systems and be incorporated with the multifaceted security system to control everything together, in addition to using other types of smart locks.

Block 203 of FIG. 2A describes that to set up the system, the system may be loaded/installed on the user device (as described in block 102 of FIG. 1A).

Blocks 204-206 of FIG. 2B describe content that is similar to the content described above in blocks 103-105. Hence, the content is not described again here for the sake of simplicity and conciseness.

Block 207 of FIG. 2C describes that the menu may have some of the following sub-menu selections including, but not limited to, Map and Manage Facility, Add Individual Accounts, Add Facial recognition Accounts, Historical Events (can be backed to cloud), Video/Audio footage, Historical User Account Data, Add Security Accounts (unlimited), Add Authorities Contact, and/or the like. The system may update the menu from "Map Facility" to "Map and Manage Facility" after the mapping data has been entered. Map Facility option may still be available in the event that an addition is to be made to the facility at a later time, as described in block 208.

Block 209 of FIG. 2C describes the submenu selection for MAP and Manage Facility may include the items including, but not limited to, Map Facility, Add/Manage hardware, Add Events, and/or the like. The User may not add hardware until the Facility has been mapped and a prompt may state to map the facility first.

Block 210 of FIG. 2C describes that the system may prompt the user to use facial recognition/self-identifying second factor authentication of whomever is mapping the facility, and the event/person is recorded under Historical Events.

Blocks 211-212 of FIG. 2D describe content that is like the content described above in blocks 108-109. Hence, the content is not described again here for the sake of simplicity and conciseness.

Block 213 of FIG. 2D describes that the system may detect a room number, and the system may ask if the user wants to use that number to name the door by providing a blank field in the center of the screen with the number in the center, but the field is a free text field that may be updated. The green check can be touched to be selected or a red "X" may be used to cancel.

Block 214 of FIG. 2E describes that windows and corridors may be identified as well, with the system also prompting to ask identification information for the window by providing a prompt in the middle of the screen that the user may enter the identification name of the window. The green check and red "X" are also options at this stage as well.

Blocks 215-219 describe content that is similar to the content described above in blocks 111-115. Hence, the content is not described again here for the sake of simplicity and conciseness.

Block 220 of FIG. 2G describes that the system may similarly make/generate recommendations where fire extinguishers should be placed throughout the walkthrough if it is purchased as an add-on. The system may prompt the user to save the recommendation. A picture of the area may be selected under the Add/Manage Hardware to add the hardware thereafter. In some aspects, the system may be upgraded to allow the system to manage the fire extinguishers.

Block 221 of FIG. 2G describes that an additional submenu item under add/manage hardware is manage external doors/windows. When selected, the system may ask alert when open (blank free text field). If it is not selected, the system may generate alert if a door is not closed right after someone badges in and if windows are opened.

Blocks 222-224 of FIG. 2H describe content that is like the content described above in blocks 117-119. Hence, the content is not described again here for the sake of simplicity and conciseness.

Block 225 of FIG. 2I describes that when batteries run low, the Map may show the Type of Hardware by an icon (lock for smart locks, security camera icon, handheld scanner for RFID Scanners, a head silhouette with a "!" in the middle for facial recognition scanners, fire alarm icon, door/window for sensors, etc.,) and its location on the map that needs attention that blinks red.

Block 226 of FIG. 2I describes that if the hardware has been compromised, the system may generate alert with a "?" next to the specific hardware in question.

Block 227 of FIG. 2I describes that if the hardware needs to be removed, select the red "X" to the right of hardware on the list that is associated for each entry.

Block 228 of FIG. 2I describes that if hardware has been taken, a "Missing (Insert type of Hardware) is alerted to all users, and a red "!" flashes next to the hardware icon.

Block 229 of FIG. 2I describes that if fire extinguishers are blocked, missing, discharged, or have lost pressure, an alert may be displayed on the screen which shows the shape of the fire extinguisher, and the icon may turn from green to red and blink the corresponding alert that may post across the screen stating "Fire Extinguisher Alert".

Blocks 230-231 of FIG. 2J describe content that is like the content described above in blocks 123-124. Hence, the content is not described again here for the sake of simplicity and conciseness.

Block 232 of FIG. 2K describes that the system may prompt the user to Add Events under Map and Manage Facility. Block 233 of FIG. 2K describes that the submenu has 3 submenu options: In-Session, Quiet Mode, and Special Events. Block 234 of FIG. 2K describes that "In session" mode is to be used when school/work shift is occurring. The times can be entered into the system so it knows when people/who should be there and when they should not be there. The date appears at the top, and two free text fields may open and only accept numerical characters and AM/PM can be selected thereafter. Save can be selected at the bottom, or delete, which may ask the user if they want to delete before it deletes the record.

Block 235 of FIG. 2L describes that the Special Events link may have a free text field to name the event, and the dates/times can be entered with free text fields and the AM/PM option. The Save button can be selected at the bottom or delete which may ask the user if they want to delete before it deletes the record. Block 236 of FIG. 2L describes that special events may be saved into Historical Events until deleted. This way, alerts are not generated when individuals are not where they are supposed to be at that time.

Block 237 of FIG. 2M describes that the system may manage RFIDs (GPS tags are optional). The Administrator may Add Individual Accounts for every individual associated with the institution. Administrators may have to add themselves as well.

Block 238 of FIG. 2M describes that once the link to Add Individual Account is selected, a screen may pop up with the person's name to be entered. The system uses the serial number from the RFID to associate the individual to it by scanning the card RFID code with a small desktop scanner. A camera icon is displayed to take a picture so that the system can then associate someone with the individual RFID account. The RFID is housed in a student/resident/employee identification card.

Block 239 of FIG. 2M describes that the system may ask where the individual is permitted to go. The user may enter corresponding rooms and times they are expected to be at specific locations, i.e., lunchroom, classroom, office room, vault, etc. The system may provide multiple spaces to enter areas and times. This may be edited at any time.

Block 240 of FIG. 2N describes that the Administrator may only assign "guest" individuals a badge in the same manner as the steps above.

Block 241 of FIG. 2N describes that the system may provide multiple fields with drop down menus to enter Rooms/corridors identified during the mapping along with options to enter time intervals next to it. Save/delete is on the right-hand side. Again, this can be edited at any time.

Block 242 of FIG. 2N describes that once the information has been acquired for the Individual Account, the user may select save and the system may return to create another account, or the user can select house icon to return to the home screen of the facility map.

Block 243 of FIG. 2N describes that the Individual Account picture is then stored into a database/cloud that can be utilized, if purchased as an add-on, by the Facial Recognition camera to determine if the correct individual is using their assigned student/personnel identification card/ should be in the facility.

Block 244 of FIG. 2O describes that individual accounts may have dates/times designated for when they are allowed to be in the facility. This can be designated under "Occupation Authorization" under the "Add Individual Accounts" which has a calendar and dates can be selected, and times can be entered.

Block 245 of FIG. 2O describes that any account may be modified once the RFID is scanned by the software and an X is next to the name and next to the picture that had entered before, and both can be deleted by selecting the "X", the user may be prompted twice if they want to delete the information. Picture updates can occur by just deleting the picture and taking a new one then saving the account. Prior account data is maintained in the historical events submenu.

Block 246 of FIG. 2P describes that the system can also use Facial Recognition technology to ensure that authorized individuals have accessed the building. Administrator must ensure they have an account as well.

Block 247 of FIG. 2P describes that once the link to Add Facial Recognition Account is selected, a screen may pop up with the person's name to be entered. A camera icon is also utilized by the system to associate a picture with authorized individuals.

Block 248 of FIG. 2P describes that when the system detects someone who is not in the (database/cloud) system or if they have a gun/other threats detected, the system may send an alert to all account users. It can be silenced by users, and the administrator or Security Account Users can select "alert authorities" if deemed necessary. Video footage is constant, and data is stored in Historical Events.

Block 249 of FIG. 2P describes that if smart locks were added to the system, internal doors may be locked and can only be unlocked by occupants during an "Intruder Alert" or "Shooter Alert" (or if AI is used for threats, "Threat Alert").

Block 250 of FIG. 2Q describes that the system may then ask to enter the contact for the authorities. The user may select Add Authorities Contact under Menu.

Block 251 of FIG. 2Q describes that the system may then provide a blank field for the Name of the facility and the telephone number.

Block 252 of FIG. 2Q describes that the system may call the authorities and state the Name of the Facility and the specific threat based on the alert the system has detected if such an event occurs.

Block 253 of FIG. 2R describes that the administrator can Add Security Accounts. There is unlimited number of accounts that can be added.

Block 254 of FIG. 2R describes that accounts can be accessed on phone app. Security account users receive updates as to specific threats. Fire Alert, Intruder Alert, Shooter Alert ("Threat Alert" if AI is used), and Security Alert may appear on the screen with location and may state the issue with a loud buzzer tone beforehand, which can be silenced. Otherwise, the home screen is the facility with all the hardware status. Also, if smart locks are engaged, they may receive an alert.

Block 255 of FIG. 2R describes that security account users can provide students/personnel with a "Hall Pass"/ Limited Access RFID that can be shown to be tracked in unison to the student's/individual's RFID on the map in the system if GPS tags are employed. Otherwise, RFID scanners can be placed in corridors/doors/areas and be required to be used to track occupants.

Block 256 of FIG. 2S describes that Hall Pass/Limited Access RFID/GPS data can be stored under Historical Events for future reference.

Block 257 of FIG. 2S describes that security account users may also get alerts for students/personnel/occupants when they are not where they are supposed to be by stating "Out of Area" by using GPS tags.

Block 258 of FIG. 2S describes that security account users may also have access to Special Events, and enter the dates/times when they may be leaving. This may be approved by the administrator for easier facilitation of system entry.

Block 259 of FIG. 2S describes that the menu for the Security Account Users may be in the same location with the same home screen and can have options for Special Events, Hall Pass, and Alert Authorities. Other administrator rights can be added if desired to specific Security Account users.

Block 260 of FIG. 2T describes that once the system is setup, the administrator's main/home screen shows the map of the facility showing current status of all hardware, i.e., door/window alarms, cameras, the RFID reader and facial recognition reader, fire detectors, smart locks, fire extinguisher status, unauthorized people, gun detection (Or AI detection of threats), and can identify if individuals are "Out of Area" and can search for individuals (GPS tags required). Camera live footage can be accessed by selecting the desired camera icon and a window pops up to show live footage.

Block 261 of FIG. 2T describes that if an exterior door is opened without a user card, the system may trip the sensor to alarm/alert the Administrator and Security Account Users on the main/home screen. If the door is open for more than a set time interval (chosen by the administrator), the system may generate an alarm/alert for the Administrator/Security Account Users. The corresponding door alert may display on the map.

Block 262 of FIG. 2T describes that when the system alerts to individuals that are not where they are supposed to be, either by RFID door scans, optional GPS tag recognition, or facial recognition, it may be stored in Historical Events. The corresponding individual location alert may be displayed on the map.

Block 263 of FIG. 2T describes that the system has a "Quiet mode" that may be used when no one is in the facility and that is for security/motion detection and records footage. It may also alert authorities and provide audio/video footage as well as location if there is an unauthorized entry/Shooter Alert situation.

Block 264 of FIG. 2U describes that the system may also detect guns and the software provides alerts; or the system can use AI to detect threats outlined in the beginning. This data is stored in Historical Events providing footage. The System may generate an alert across the screen that states "Shooter Alert" if guns are just discovered, or "Threat Alert" for AI detection of other threats outlined in the beginning. The corresponding threat location may be displayed on the map.

Block 265 of FIG. 2U describes that when the system detects someone (by facial recognition) and determines they do not have account in the system (by juxtaposing video imagine to account entries), it may send an alert across the screen to all account users "Intruder Alert". It may be silenced by users, and the administrator or Security Account users can select "alert authorities" if deemed necessary (this alert transpires if no gun/AI detected threats were found.) The corresponding intruder location may be displayed on the map. Smart Locks can instantly engage and only occupants can open the door, and an alert can be displayed to all users. Video footage is constant and is stored in Historical Events. In some aspects, in locations where the authorities store images of personnel and criminals in a database/software and share the information, the system can be synced to their database and juxtapose authorities and criminals and alert users who may be on the premise.

Block 266 of FIG. 2V describes that the system may alert to Fire Alarms going off and an alert across the screen may state: Fire Alert. The corresponding fire sensor location alert may be displayed on the map.

Block 267 of FIG. 2V describes that when the system conveys an "Intruder Alert", "Shooter Alert" (or "Threat Alert" if AI is used for other threats), "Fire Alert", or "Out of Area", the system can provide the facility name, alert type, and video footage to authorities if "Provide Authorities Information" is selected under Add Authorities Contact Submenu. The authorities may only login during such an incident to assess the situation (see what the Alert is, the location of the alert, and where the employees/students/residents are in the building).

Figure 3:
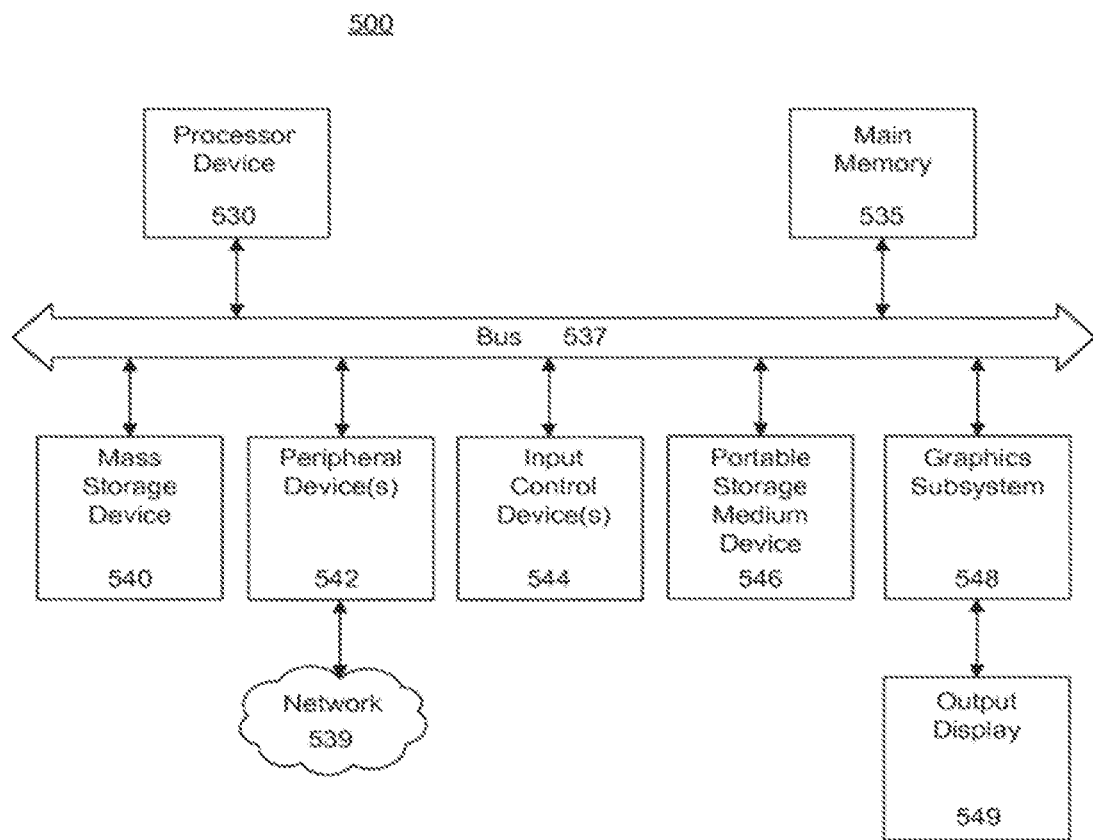
FIG. 3 is a block diagram of a general and/or special purpose computer 500, which may be a general and/or special purpose computing device, according to some example embodiments of the invention.

FIG. 3 is a block diagram of a general and/or special purpose computer 500, which may be a general and/or special purpose computing device, in accordance with some of the example embodiments of the invention. The computer 500 may be implemented as a conventional computer system, an embedded controller, a laptop, a server, a mobile device, a smartphone, a wearable computer, a set-top box, a kiosk, a vehicular information system, one more processors associated with a device, a customized machine, any other hardware platform, or any combination or multiplicity thereof. Computer 500 may be a distributed system configured to function using multiple computing machines interconnected via a data network or bus system.

Computer 500 may include without limitation a processor 530, a graphics processing unit (GPU), Application Specific Integrated Circuit (ASIC), or any combination thereof. Computer 500 may also include a main memory 535, and an interconnect bus 537. The processor 530 may include without limitation a single microprocessor or may include a plurality of microprocessors for configuring the computer 500 as a multi-processor system.

Processor 530 may be configured to execute code or instructions to perform the operations and functionality described herein, manage request flow and address mappings, and to perform calculations and generate commands. Processor 530 may be configured to monitor and control the operation of the components in computer 500. Processor 530 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof.

Processor 530 may be a single processing unit, multiple processing units, a single processing core, multiple processing cores, special purpose processing cores, co-processors, or any combination thereof. According to certain embodiments, processor 530 along with other components of computer 500 may be a virtualized computing machine executing within one or more other computing machines.

The main memory 535 stores, among other things, instructions and/or data for execution by the processor 530. The main memory 535 may include banks of dynamic random-access memory (DRAM), as well as cache memory.

The computer 500 may further include a mass storage device(s) 540, peripheral device(s) 542, non-transitory storage medium device(s) 546, input control device(s) 544, a graphics subsystem 548, and/or a display 549. For explanatory purposes, all components in computer 500 are shown in FIG. 3 as being coupled through bus 537. However, computer 500 is not so limited. Devices and systems of the computer 500 may be coupled through one or more data transport means. For example, processor 530 and/or the main memory 535 may be coupled through a local microprocessor bus. Mass storage 540, peripheral device(s) 542, portable storage medium device(s) 546, and/or graphics subsystem 548 may be coupled via one or more input/output (I/O) buses.

Mass storage 540 may include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof.

Mass storage 540 may store one or more operating systems, application programs and program modules, data, or any other information. Mass storage may be part of, or connected to, computer 500. Mass storage 540 may also be part of one or more other computing machines that are in communication with computer 500, such as servers, database servers, cloud storage, network attached storage, and so forth.

Portable storage medium device 546 operates in conjunction with a nonvolatile portable storage medium, such as, for example, a compact disc read only memory (CD-ROM), to input and output data and code to and from computer 500. In some embodiments, the software for storing information may be stored on a portable storage medium and may be inputted into computer 500 via portable storage medium device 546.

Peripheral device(s) 542 may include any type of computer support device, such as, for example, an input/output (I/O) interface configured to add additional functionality to computer 500. For example, peripheral device(s) 542 may include a network interface card for interfacing computer 500 with network 539.

Input control device(s) 544 provides a portion of the user interface for a user of computer 500. Input control device(s) 544 may include a keypad and/or a cursor control device. The keypad may be configured for inputting alphanumeric characters and/or other key information. The cursor control device may include, for example, a handheld controller or mouse, a trackball, a stylus, and/or cursor direction keys. To display textual and graphical information, computer 500 may include graphics subsystem 548 and output display 549. Output display 549 may include a cathode ray tube (CRT) display and/or a liquid crystal display (LCD). Graphics subsystem 548 receives textual and graphical information and processes the information for output-to-output display 549.

Computer 500 may operate in a networked environment using logical connections through network 539 to one or more other systems or computing machines across network 539. Network 539 may include wide area networks (WAN), local area networks (LAN), intranets, the Internet, wireless access networks, wired networks, mobile networks, telephone networks, optical networks, or combinations thereof.

Network 539 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

Each component of computer 500 may represent a broad category of a computer component of a general and/or special purpose computer. Components of computer 500 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any software configuration. They may find applicability in any computing or processing environment. The terms "computer-readable", "machine-accessible medium" or "machine-readable medium" used herein shall include any medium that is configured for storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general-purpose computer, a specialized digital computer and/or a microprocessor programmed according to the teachings of the present disclosure, as is apparent to those skilled in the computer art. Appropriate software coding (instructions) may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures, methods, processes, algorithms, and models described above.

The above-disclosed embodiments have been presented for the purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence or combined into a single step/process. The scope of the claims is intended to broadly cover the disclosed embodiments and any such modification.

In some aspects of the present disclosure a method is disclosed that may include obtaining, by a processor, inputs from a plurality of detection units and information associated with a facility. The plurality of detection units may be configured to monitor an activity in the facility. The method may further include determining, by the processor, a malicious activity based on the inputs and the information, and generating, by the processor, security alert responsive to determination of the activity.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

The claimed invention is:

1. A surveillance system for a facility having a plurality of rooms, the surveillance system comprising:
    a plurality of detection units configured to monitor activity in the facility;
    a transceiver configured to receive information associated with the facility;
    an image capturing device; and
    a processor communicatively coupled to the plurality of detection units, the image capturing device, and the transceiver, wherein the processor is configured to:
        prompt a user to capture video footage, with the image capturing device, of the facility by way of a walkthrough of the plurality of rooms, the captured video footage sufficient to define a layout of the plurality of rooms;
        identify one or more facility attributes from the captured video footage;
        during the walkthrough, recommend a position in the facility for each of the plurality of detection units based on the identified one or more facility attributes;
        generate a map of the facility responsive to the identified one or more facility attributes:
        obtain inputs from each detection unit, of the plurality of detection units, placed in the position recommended;
        obtain information from the transceiver;
        determine a malicious/suspicious activity based on the inputs and the information; and
        generate security alert responsive to determination of the malicious activity.

2. The surveillance system of claim 1, wherein the plurality of detection units comprises at least one of: Radio Frequency Identification (RFID) unit, RFID pass scanner, security cameras, security alarms for door/windows, fire alarms, geofencing, RFID parking/garage door pass scanner, smart locks, facial recognition scanners, and Global Positioning System (GPS).

3. The surveillance system of claim 1, wherein the one or more facility attributes comprises one or more windows, one or more doors, and one or more hallways.

4. The surveillance system of claim 1, wherein the image capturing device is embodied in a mobile computing device having the processor.

5. The surveillance system of claim 1, the processor is further configured to:
    prompt the user to save each position recommended; and
    store an image, from the captured video footage, of each saved position recommended.

6. The surveillance system of claim 1, the processor is further configured to:
    prompt the user to designate a name for each identified facility attribute.

7. The surveillance system of claim 1, the position recommended is a physical component of the facility capable of supporting one detection unity of the plurality of the detection units so that one detection unit can monitor an activity in the facility.

8. A method for providing surveillance of a facility having a plurality of rooms, the method comprising:
    performing a walkthrough of the plurality of rooms with a computing device having an image capturing device and a processor;
    capturing video footage of the facility sufficient to define a layout of the plurality of rooms;
    identifying, by the processor, one or more facility attributes from the captured video footage;
    recommending, by the processor, a position in the facility for each of a plurality of detection units based on the identified one or more facility attributes;
    placing each detection unit in the position recommended;
    obtaining, by the processor, inputs from a plurality of detection units and information associated with a facility, wherein the plurality of detection units is configured to monitor an activity in the facility;
    determining, by the processor, a malicious/suspicious activity based on the inputs and the information; and
    generating, in real time, by the processor, security alert responsive to determination of the malicious activity.

9. The method of claim 8 further comprising performing a predetermined action responsive to determination of the activity, wherein the predetermined action comprises transmitting instructions to one or more output units.

10. The method of claim 8 further comprising:
    combining inputs from the plurality of detection units; and
    determining the malicious activity responsive to combining the inputs.

11. The method of claim 8, further comprising generating, by the processor, a map of the facility responsive to the identified one or more facility attributes.

* * * * *